United States Patent
Giuliano

(10) Patent No.: US 10,938,300 B2
(45) Date of Patent: Mar. 2, 2021

(54) POWER CONVERTER WITH MODULAR STAGES CONNECTED BY FLOATING TERMINALS

(71) Applicant: pSemi Corporation, San Diego, CA (US)

(72) Inventor: David M. Giuliano, Bedford, NH (US)

(73) Assignee: pSemi Corporation, San Diego, CA (US)

( * ) Notice: Subject to any disclaimer, the term of this patent is extended or adjusted under 35 U.S.C. 154(b) by 0 days.

(21) Appl. No.: 16/931,768

(22) Filed: Jul. 17, 2020

(65) Prior Publication Data
US 2020/0350818 A1    Nov. 5, 2020

Related U.S. Application Data

(63) Continuation of application No. 16/444,428, filed on Jun. 18, 2019, which is a continuation of application
(Continued)

(51) Int. Cl.
*H02M 3/07*    (2006.01)
*H02M 1/42*    (2007.01)
(Continued)

(52) U.S. Cl.
CPC .............. *H02M 3/07* (2013.01); *H02M 1/42* (2013.01); *H02M 1/4225* (2013.01); *H02M 3/00* (2013.01);
(Continued)

(58) Field of Classification Search
CPC combination set(s) only.
See application file for complete search history.

(56) References Cited

U.S. PATENT DOCUMENTS

| 4,408,268 A | 10/1983 | Peters |
| 5,006,782 A | 4/1991 | Pelly |
(Continued)

FOREIGN PATENT DOCUMENTS

| CN | 101636702 | 1/2010 |
| CN | 108964442 A | 12/2018 |
(Continued)

OTHER PUBLICATIONS

The First Office Action dated Jul. 2, 2015, Chinese Patent Application 201280033387.X, 11 pgs.
(Continued)

*Primary Examiner* — Adam D Houston
(74) *Attorney, Agent, or Firm* — Berkeley Law & Technology Group, LLP

(57) ABSTRACT

An apparatus for electric power conversion includes a converter having a regulating circuit and switching network. The regulating circuit has magnetic storage elements, and switches connected to the magnetic storage elements and controllable to switch between switching configurations. The regulating circuit maintains an average DC current through a magnetic storage element. The switching network includes charge storage elements connected to switches that are controllable to switch between plural switch configurations. In one configuration, the switches forms an arrangement of charge storage elements in which at least one charge storage element is charged using the magnetic storage element through the network input or output port. In another, the switches form an arrangement of charge storage elements in which an element discharges using the magnetic storage element through one of the input port and output port of the switching network.

30 Claims, 20 Drawing Sheets

Related U.S. Application Data

No. 15/618,481, filed on Jun. 9, 2017, now Pat. No. 10,326,358, which is a continuation of application No. 15/138,692, filed on Apr. 26, 2016, now Pat. No. 9,712,051, which is a continuation of application No. 14/513,747, filed on Oct. 14, 2014, now Pat. No. 9,362,826, which is a continuation of application No. 13/771,904, filed on Feb. 20, 2013, now Pat. No. 8,860,396, which is a continuation of application No. PCT/US2012/036455, filed on May 4, 2012.

(60) Provisional application No. 61/577,271, filed on Dec. 19, 2011, provisional application No. 61/548,360, filed on Oct. 18, 2011, provisional application No. 61/482,838, filed on May 5, 2011.

(51) Int. Cl.
  *H02M 3/158* (2006.01)
  *H02M 3/00* (2006.01)
  *H02M 1/00* (2006.01)

(52) U.S. Cl.
  CPC .......... *H02M 3/158* (2013.01); *H02M 3/1582* (2013.01); *H02M 2001/007* (2013.01); *H02M 2001/4291* (2013.01); *H02M 2003/077* (2013.01); *Y02B 70/10* (2013.01)

(56) References Cited

U.S. PATENT DOCUMENTS

| | | | |
|---|---|---|---|
| 5,345,376 A | 9/1994 | Nourbakhsh | |
| 5,548,206 A * | 8/1996 | Soo | H02M 3/1588 323/284 |
| 6,400,579 B2 | 6/2002 | Cuk | |
| 6,791,298 B2 | 9/2004 | Shenal | |
| 6,798,177 B1 | 9/2004 | Liu | |
| 7,777,459 B2 | 8/2010 | Williams | |
| 8,076,915 B2 | 12/2011 | Nakazawa | |
| 8,089,788 B2 | 1/2012 | Rinkle | |
| 8,106,597 B2 | 1/2012 | Mednik | |
| 8,111,052 B2 | 2/2012 | Glovinsky | |
| 8,330,436 B2 | 12/2012 | Oraw | |
| 8,423,800 B2 | 4/2013 | Huang | |
| 8,582,333 B2 | 11/2013 | Oraw | |
| 8,718,188 B2 | 5/2014 | Balteanu | |
| 8,854,019 B1 | 10/2014 | Levesque | |
| 8,856,562 B2 | 10/2014 | Huang | |
| 9,577,590 B2 | 2/2017 | Levesque et al. | |
| 10,680,515 B2 | 6/2020 | Giuliano | |
| 2002/0158660 A1 | 10/2002 | Jang et al. | |
| 2003/0227280 A1 | 12/2003 | Vinciarelli | |
| 2004/0041620 A1 | 3/2004 | D'Angelo | |
| 2005/0024125 A1 | 2/2005 | McNitt et al. | |
| 2006/0139021 A1 | 6/2006 | Taurand | |
| 2006/0213890 A1 * | 9/2006 | Kooken | H02M 1/4225 219/130.21 |
| 2006/0226130 A1 * | 10/2006 | Kooken | H02M 3/1584 219/130.1 |
| 2007/0051712 A1 * | 3/2007 | Kooken | B23K 9/1043 219/130.1 |
| 2007/0091655 A1 | 4/2007 | Oyama | |
| 2008/0157733 A1 | 7/2008 | Williams | |
| 2008/0239772 A1 | 10/2008 | Oraw et al. | |
| 2009/0102439 A1 | 4/2009 | Williams | |
| 2009/0278520 A1 * | 11/2009 | Perreault | H02M 3/07 323/282 |
| 2010/0117612 A1 | 5/2010 | Klootwijk | |
| 2010/0291888 A1 | 11/2010 | Hadjichristos | |
| 2011/0175591 A1 | 7/2011 | Cuk | |
| 2012/0064953 A1 | 3/2012 | Dagher | |
| 2012/0170334 A1 | 7/2012 | Menegoli | |
| 2012/0249096 A1 | 10/2012 | Enenkel | |
| 2012/0252382 A1 | 10/2012 | Bashir | |
| 2012/0313602 A1 | 12/2012 | Perrault | |
| 2012/0326684 A1 | 12/2012 | Perrault | |
| 2013/0005286 A1 | 1/2013 | Chan | |
| 2013/0058141 A1 | 3/2013 | Oraw | |
| 2013/0094157 A1 * | 4/2013 | Giuliano | H01L 23/5223 361/748 |
| 2013/0106380 A1 * | 5/2013 | Marsili | H02M 3/07 323/283 |
| 2013/0181521 A1 | 7/2013 | Khlat | |
| 2013/0229841 A1 * | 9/2013 | Giuliano | H02M 3/00 363/60 |
| 2014/0015731 A1 | 1/2014 | Khlat | |
| 2014/0159681 A1 | 6/2014 | Oraw | |
| 2015/0023063 A1 | 1/2015 | Perreault | |
| 2015/0084701 A1 * | 3/2015 | Perreault | H03F 3/005 330/297 |
| 2015/0102798 A1 * | 4/2015 | Giuliano | H02M 3/00 323/312 |
| 2015/0155895 A1 * | 6/2015 | Perreault | H03F 3/19 455/127.3 |
| 2015/0364991 A1 * | 12/2015 | Chung | H02M 1/44 323/301 |
| 2016/0093948 A1 | 3/2016 | Lehtola | |
| 2016/0094126 A1 * | 3/2016 | Liu | H03K 7/06 455/73 |
| 2016/0197552 A1 * | 7/2016 | Giuliano | H02M 3/158 363/60 |
| 2017/0244318 A1 * | 8/2017 | Giuliano | H02M 3/07 |
| 2017/0279374 A1 * | 9/2017 | Friebe | H02M 3/158 |
| 2017/0300078 A1 * | 10/2017 | Puggelli | H02M 3/1582 |
| 2017/0302093 A1 * | 10/2017 | Petersen | H02M 3/158 |
| 2018/0205315 A1 * | 7/2018 | Giuliano | H02M 3/073 |
| 2019/0027468 A1 * | 1/2019 | Giuliano | H01L 27/016 |
| 2019/0028018 A1 * | 1/2019 | Datta | H02M 3/00 |
| 2019/0207513 A1 * | 7/2019 | Ramadass | H02M 7/219 |
| 2020/0021187 A1 * | 1/2020 | Chang | H02M 3/07 |
| 2020/0083805 A1 * | 3/2020 | Mauri | H02M 3/07 |
| 2020/0112247 A1 | 4/2020 | Giuliano | |
| 2020/0136494 A1 * | 4/2020 | Kazama | H02M 1/08 |
| 2020/0195136 A1 * | 6/2020 | Huang | H02M 1/00 |
| 2020/0204172 A1 * | 6/2020 | Geng | H03K 17/133 |
| 2020/0246626 A1 * | 8/2020 | Labbe | A61B 5/0538 |
| 2020/0253520 A1 * | 8/2020 | Wang | A61B 5/002 |

FOREIGN PATENT DOCUMENTS

| | | |
|---|---|---|
| EP | 1199788 A1 | 4/2002 |
| EP | 2705597 B1 | 8/2018 |
| EP | 3425784 A1 | 1/2019 |
| FR | 2852748 A1 | 9/2004 |
| GB | 2505371 A | 2/2014 |
| JP | 10327573 | 12/1998 |
| JP | 11235053 | 8/1999 |
| JP | 2000134095 | 5/2000 |
| JP | 2002233139 | 8/2002 |
| JP | 2010045943 | 2/2010 |
| JP | 2018508178 | 3/2018 |
| KR | 20140015528 | 2/2014 |
| KR | 20140015528 A | 2/2014 |
| WO | WO2006093600 | 9/2006 |
| WO | WO200912900 | 9/2009 |
| WO | 20120151466 A3 | 11/2012 |
| WO | WO2013059446 | 4/2013 |
| WO | WO2013096416 | 6/2013 |
| WO | WO2014154390 | 10/2014 |
| WO | WO2014169186 | 10/2014 |

OTHER PUBLICATIONS

Claims as amended in the response to the First Office Action filed Jan. 18, 2016, Chinese Patent Application 201280033387.X, 6 pgs.
The Second Office Action dated Apr. 7, 2016, Chinese Patent Application 201280033387.X, 10 pgs.
Claims as amended in the response to the Second Office Action filed Aug. 18, 2016, Chinese Patent Application 201280033387.X, 6 pgs.
The Third Office Action dated Jan. 23, 2017, Chinese Patent Application 201280033387.X, 13 pgs.

(56) References Cited

OTHER PUBLICATIONS

Claims as amended in the response to the Third Office Action filed Jun. 1, 2017, Chinese Patent Application 201280033387.X, 6 pgs.
The Fourth Office Action dated Jan. 23, 2017, Chinese Patent Application 201280033387.X, 14 pgs.
Claims as amended in the response to the Fourth Office Action filed Jan. 4, 2018, Chinese Patent Application 201280033387.X, 6 pgs.
Certificate of Patent dated Sep. 21, 2018, Chinese Patent Application 201280033387.X, 1 pg.
First Office Action dated Dec. 30, 2018, Chinese Patent Application 201810954743.0, 13 pgs.
Claims as amended in the response to the First Office Action filed Jul. 14, 2020, Chinese Patent Application 201810954743.0, 9 pgs.
Extended European Search Report dated Feb. 18, 2015, European Patent Application No. 12780024.1, 7 pgs.
Claims as amended in the response to the Extended European Search Report filed Dec. 16, 2015, European Patent Application No. 12780024.1, 9 pgs.
Communication pursuant to Article 94(3) EPC dated Feb. 23, 2016, European Patent Application No. 12780024.1, 7 pgs.
Response to Communication pursuant to Article 94(3) EPC dated Jun. 16, 2016, European Patent Application No. 12780024.1, 7 pgs.
Communication pursuant to Article 94(3) EPC dated Jan. 3, 2017, European Patent Application No. 12780024.1, 5 pgs.
Response to Communication pursuant to Article 94(3) EPC filed Jun. 8, 2017, European Patent Application No. 12780024.1, 40 pgs.
Notice of Intention to Grant dated Feb. 7, 2018, European Patent Application No. 12780024.1, 7 pgs.
Response to Notice of Intention to Grant filed Jun. 13, 2018, European Patent Application No. 12780024.1, 24 pgs.
Certificate of Grant dated Aug. 15, 2018, European Patent No. 2705597, 1 pg.
European Search Report dated Sep. 26, 2018, European Application No. 18188795, 3 pgs.
Notice of Loss of Rights per Rule 112(1) EPC dated Jun. 24, 2020, European Application No. 18188795, 2 pgs.
Notification of Reason for Refusal dated Nov. 18, 2014, Korean Patent Application No. 1020137032399, 5 pgs.
Decision to refuse application dated May 22, 2015, Korean Patent Application No. 1020137032399, 4 pgs.
Claims as amended in the response filed Jun. 17, 2015 in response to the Decision to refuse application, Korean Patent Application No. 1020137032399, 2 pgs.
Certificate of Patent dated Sep. 23, 2015, Korean Patent No. 101556838, 2 pgs.
U.S. Appl. No. 61/482,838, filed May 5, 2011, 50 pgs.
Communication pursuant to Article 94(3) EPC, EP Patent Application No. 18 188 795.1, European Patent Office, dated Nov. 11, 2019, 7 pgs.
Dong Cao et al: "Multiphase Multilevel Modular DC-DC Converter for High-Current High-Gain TEG Application", IEEE Transactions on Industry Applications, IEEE Service Center, Piscataway, NJ, US, vol. 47, No. 3, May 1, 2011 (May 1, 2011), pp. 1400-1408, XP011477763, ISSN: 0093-9994, DOI: 10.1109/TIA.2011.2125771.
Pal Andreassen et al: "Digital Variable Frequency Control for Zero Voltage Switching and Interleaving of Synchronous Buck Converters", 12th International Power Electronics and Motion Control Conference, IEEE, PI, Aug. 1, 2006 (Aug. 1, 2006), pp. 184-188, XP031008911, ISBN: 978-1-4244-0120-8.
Luo et al., "Investigation of switched-capacitorized DC/DC converters," 2009 IEEE 6th International Power Electronics and Motion Control Conference, Wuhan, China, May 17-20, 2009, pp. 1270-1276, doi: 10.1109/IPEMC.2009.5157581.
Cheng, "New generation of switched capacitor converters," PESC 98 Record. 29th Annual IEEE Power Electronics Specialists Conference (Cat. No. 98CH36196), Fukuoka, Japan, May 22, 1998, pp. 1529-1535 vol. 2, doi: 10/1109/PESC.1998.703377.
European Search Report, EP Patent Application No. 18188795.1, European Patent Office, dated Oct. 9, 2018, 2 pgs.
European Search Opinion, EP Patent Application No. 18188795.1, European Patent Office, dated Oct. 9, 2018, 4 pgs.
U.S. Appl. No. 61/380,522, filed Sep. 7, 2010, 76 pgs.
U.S. Appl. No. 61/417,633, filed Nov. 29, 2010, 158 pgs.
Examiner Initialed IDS 1449/SB08 Listing from priority U.S. Appl. No. 16/444,428 to show previously considered prior art dated Oct. 26, 2020.
U.S. Appl. No. 13/771,904 U.S. Appl. No. filed Feb. 20, 2013, 62 pages.
U.S. Appl. No. 13/771,904 Filing Receipt and Notice to File Corrected Application Papers dated Mar. 20, 2013, 6 pages.
U.S. Appl. No. 13/771,904 Response to Notice to File Corrected Application Papers dated May 20, 2013, 30 pages.
U.S. Appl. No. 13/771,904 Updated Filing Receipt and Informational Notice dated May 28, 2013, 4 pages.
U.S. Appl. No. 13/771,904 Notice of Publication dated Sep. 5, 2013, 1 page.
U.S. Appl. No. 13/771,904 Nonfinal Office Action dated Sep. 13, 2013, 12 pages.
U.S. Appl. No. 13/771,904 Amendment dated Mar. 13, 2014, 11 pages.
U.S. Appl. No. 13/771,904 Final Office Action dated Apr. 8, 2014, 16 pages.
U.S. Appl. No. 13/771,904 Amendment dated May 23, 2014, 11 pages.
U.S. Appl. No. 13/771,904 Notice of Allowance dated Jun. 9, 2014, 12 pages.
U.S. Appl. No. 13/771,904 Issue Fee Payment and 312 Amendment dated Aug. 29, 2014, 14 pages.
U.S. Appl. No. 13/771,904 Examiner Response to 312 Amendment dated Sep. 11, 2014, 3 pages.
U.S. Appl. No. 13/771,904 Issue Notification dated Sep. 24, 2014, 1 page.
U.S. Appl. No. 14/513,747 U.S. Appl. No. filed Oct. 14, 2014, 76 pages.
U.S. Appl. No. 14/513,747 Filing Receipt and Notice to File Corrected Application Papers dated Oct. 22, 2014, 5 pages.
U.S. Appl. No. 14/513,747 Response to Notice to File Corrected Application Papers with Amendment dated Dec. 22, 2014, 47 pages.
U.S. Appl. No. 14/513,747, filed Jan. 5, 2015, 3 pages.
U.S. Appl. No. 14/513,747 Notice of Publication dated Apr. 16, 2015, 1 page.
U.S. Appl. No. 14/513,747 Petition to Make Special Under Patent Prosecution Highway dated Apr. 22, 2015, 4 pages.
U.S. Appl. No. 14/513,747 Decision Granting Petition to Make Special Under Patent Prosecution Highway dated Apr. 22, 2015, 5 pages.
U.S. Appl. No. 14/513,747 Non-final Office Action dated Jun. 17, 2015, 19 pages.
U.S. Appl. No. 14/513,747 Amendment filed Sep. 17, 2015, 13 pages.
U.S. Appl. No. 14/513,747 Final Office Action dated Oct. 14, 2015, 17 pages.
U.S. Appl. No. 14/513,747 Amendment filed Jan. 14, 2016, 12 pages.
U.S. Appl. No. 14/513,747 Notice of Allowance dated Jan. 26, 2016, 12 pages.
U.S. Appl. No. 14/513,747 Issue Fee Payment filed Apr. 26, 2016, 1 page.
U.S. Appl. No. 14/513,747 Issue Notification dated May 10, 2016, 1 page.
U.S. Appl. No. 15/138,692 US Patent Application filed Apr. 26, 2016, 60 pages.
U.S. Appl. No. 15/138,692 Filing Receipt and Notice to File Missing Parts dated May 13, 2016, 6 pages.
U.S. Appl. No. 15/138,692 Response to Notice to File Missing Parts and Amendment dated Jul. 13, 2016, 14 pages.
U.S. Appl. No. 15/138,692, Updated Filing Receipt dated Jul. 13, 2016, 4 pages.
U.S. Appl. No. 15/138,692 Notice of Publication dated Nov. 3, 2016, 1 page.
U.S. Appl. No. 15/138,692 Notice of Allowance and Allowability dated Mar. 10, 2017, 24 pages.

(56) References Cited

OTHER PUBLICATIONS

U.S. Appl. No. 15/138,692 Supplemental Notice of Allowability dated Apr. 11, 2017, 5 pages.
U.S. Appl. No. 15/138,692 Issue Fee Payment and 312 Amendment filed Jun. 9, 2017, 10 pages.
U.S. Appl. No. 15/138,692 Examiner Response to 312 Amendment and Corrected Filing Receipt dated Jun. 21, 2017, 6 pages.
U.S. Appl. No. 15/138,692 Issue Notification dated Jun. 28, 2017, 1 page.
U.S. Appl. No. 15/618,481 US Patent Application filed Jun. 9, 2017, 63 pages.
U.S. Appl. No. 15/618,481 Filing Receipt and Notice to File Missing Parts dated Jun. 20, 2017, 6 pages.
U.S. Appl. No. 15/618,481 Response to Notice to File Missing Parts and Preliminary Amendment filed Oct. 20, 2017, 21 pages.
U.S. Appl. No. 15/618,481 Request to Update Name of Applicant filed Oct. 24, 2017, 11 pages.
U.S. Appl. No. 15/618,481 Updated Filing Receipt dated Oct. 24, 2017, 5 pages.
U.S. Appl. No. 15/618,481 Corrected Filing Receipt and Acceptance of Power of Attorney dated Oct. 26, 2017, 5 pages.
U.S. Appl. No. 15/618,481 Notice of Publication dated Feb. 1, 2018, 1 page.
U.S. Appl. No. 15/618,481 Request to Update Name of Applicant filed Feb. 23, 2018, 12 pages.
U.S. Appl. No. 15/618,481 Corrected Filing Receipt dated May 14, 2018, 4 pages.
U.S. Appl. No. 15/618,481 Notice of Allowance and Allowability dated Feb. 6, 2019, 27 pages.
U.S. Appl. No. 15/618,481 Issue Fee Payment dated May 3, 2019, 6 pages.
U.S. Appl. No. 15/618,481 Issue Notification dated May 29, 2019, 1 page.
U.S. Appl. No. 16/444,428 US Patent Application filed Jun. 18, 2019, 59 pages.
U.S. Appl. No. 16/444,428 Filing Receipt and Notice to File Missing Parts dated Jun. 26, 2019, 7 pages.
U.S. Appl. No. 16/444,428 Response to Notice to File Missing Parts dated Dec. 26, 2019, 15 pages.
U.S. Appl. No. 16/444,428 Updated Filing dated Dec. 30, 2019, 6 pages.
U.S. Appl. No. 16/444,428 Notice of Publication dated Apr. 9, 2020, 1 page.
U.S. Appl. No. 16/444,428 Preliminary Amendment dated May 8, 2020, 13 pages.
U.S. Appl. No. 16/444,428 Supplemental Amendment dated Jul. 29, 2020, 13 pages.
U.S. Appl. No. 16/444,428 Notice of Allowance and Allowability dated Aug. 24, 2020, 33 pages.
U.S. Appl. No. 16/444,428 Request for Continued Examination filed Sep. 8, 2020, 14 pages.
U.S. Appl. No. 16/444,428 Notice of Allowance and Allowability dated Sep. 16, 2020, 33 pages.
U.S. Appl. No. 16/919,033 US Patent Application filed Jul. 1, 2020, 73 pages.
U.S. Appl. No. 16/919,033 Amended Application Data Sheet filed Jul. 2, 2020, 7 pages.
U.S. Appl. No. 16/919,033 Filing Receipt and Notice of Missing Parts dated Jul. 15, 2020, 12 pages.
U.S. Appl. No. 15/068,985 Patent Application filed Mar. 14, 2016, 90 pages.
U.S. Appl. No. 15/068,985 Filing Receipt and Informational Notice dated Mar. 29, 2016, 5 pages.
U.S. Appl. No. 15/068,985 Request for Corrected filed Apr. 29, 2016, 8 pages.
U.S. Appl. No. 15/068,985 Preliminary Amendment filed Apr. 29, 2016, 3 pages.
U.S. Appl. No. 15/068,985 Corrected Filing Receipt dated May 9, 2016, 3 pages.
U.S. Appl. No. 15/068,985 Request for Corrected Filing Receipt dated May 31, 2016, 1 page.
U.S. Appl. No. 15/068,985 Corrected Filing Receipt dated Jun. 8, 2016, 4 pages.
U.S. Appl. No. 15/068,985 Notice of Publication dated Jul. 7, 2016, 1 page.
U.S. Appl. No. 15/068,985 Non-final Office Action dated Mar. 7, 2017, 20 pages.
U.S. Appl. No. 15/068,985 Response to Non-final Office Action dated Jul. 7, 2017, 20 pages.
U.S. Appl. No. 15/068,985 Notice of Allowance dated Aug. 11, 2017, 17 pages.
U.S. Appl. No. 15/068,985 Issue Fee Payment and 312 Amendment filed Nov. 9, 2017, 16 pages.
U.S. Appl. No. 15/068,985 Request to Expedite Petition to Correct Priority filed Nov. 14, 2017, 5 pages.
U.S. Appl. No. 15/068,985 Order Granting Petition to Correct Priority and Corrected Filing Receipt dated Nov. 28, 2017, 6 pages.
U.S. Appl. No. 15/068,985 Issue Notification dated Jan. 10, 2018, 1 page.
U.S. Appl. No. 15/813,546 Application as filed Nov. 15, 2017, 1 page.
U.S. Appl. No. 15/813,546 Filing Receipt and Notice to File Missing Parts dated Dec. 13, 2017, 7 pages.
U.S. Appl. No. 15/813,546 Response to Notice to File Missing Parts and Preliminary Amendment dated Feb. 12, 2018, 12 pages.
U.S. Appl. No. 15/813,546 Updated Filing Receipt dated Feb. 15, 2018, 5 pages.
U.S. Appl. No. 15/813,546 Amended Application Data Sheet filed Feb. 28, 2018, 12 pages.
U.S. Appl. No. 15/813,546 Notice of Publication dated May 24, 2018, 1 page.
U.S. Appl. No. 15/813,546 Non-final Office Action dated Jun. 1, 2018, 17 pages.
U.S. Appl. No. 15/813,546 Amendment and terminal Disclaimer filed Aug. 30, 2018, 15 pages.
U.S. Appl. No. 15/813,546 Request to Change Applicant Name filed Sep. 5, 2018, 13 pages.
U.S. Appl. No. 15/813,546 Updated Filing Receipt dated Jan. 9, 2019, 4 pages.
U.S. Appl. No. 15/813,546 Final Rejection dated Mar. 11, 2019, 10 pages.
U.S. Appl. No. 15/813,546 Response to Final Rejection and Terminal Disclaimer dated Mar. 20, 2019, 10 pages.
U.S. Appl. No. 15/813,546 Approval Terminal Disclaimer dated Mar. 22, 2019, 1 page.
U.S. Appl. No. 15/813,546 Notice of Allowance and Allowability dated Apr. 3, 2019, 16 pages.
U.S. Appl. No. 15/813,546 Supplemental Notice of Allowability dated Jun. 25, 2019, 3 pages.
U.S. Appl. No. 15/813,546 Issue Fee Payment and 312 Amendment dated Jul. 3, 2019, 15 pages.
U.S. Appl. No. 15/813,546 Response to 312 Amendment dated Aug. 6, 2019, 3 pages.
U.S. Appl. No. 15/813,546 Issue Notification dated Aug. 14, 2019, 1 page.
U.S. Appl. No. 16/534,196 Patent Application filed Aug. 7, 2019, 81 pages.
U.S. Appl. No. 16/534,196 Filing Receipt and Notice to File Missing Parts dated Aug. 21, 2019, 7 pages.
U.S. Appl. No. 16/534,196 Response to Notice to File Missing Parts dated Jan. 14, 2020, 12 pages.
U.S. Appl. No. 16/534,196 Updated Filing Receipt dated Jan. 14, 2020, 5 pages.
U.S. Appl. No. 16/534,196 Updated Filing Receipt dated Jan. 27, 2020, 4 pages.
U.S. Appl. No. 16/534,196 Non-final Office Action dated Jan. 27, 2020, 14 pages.
U.S. Appl. No. 16/534,196 Notice of Publication dated Apr. 23, 2020, 1 page.
U.S. Appl. No. 16/534,196 Amendment dated Jul. 30, 2020, 15 pages.

(56) References Cited

OTHER PUBLICATIONS

PCT/US2017/023191 PCT Application filed Mar. 20, 2017, 94 pages.
PCT/US2017/023191 Intl Search Report and Written Opinion dated Jun. 30, 2017, 9 pages.
U.S. Appl. No. 16/085,680 Patent Application filed Sep. 17, 2018, 391 pages.
U.S. Appl. No. 16/085,680 Filing Receipt dated Jan. 9, 2019, 7 pages.
U.S. Appl. No. 16/085,680 Notice of Allowance and Allowability dated Mar. 8, 2019, 17 pages.
U.S. Appl. No. 16/085,680 Notice of Publication dated Apr. 18, 2019, 1 page.
U.S. Appl. No. 16/085,680 Replacement Figures filed Apr. 23, 2019, 8 pages.
U.S. Appl. No. 16/085,680 Examiner Interview Summary dated May 14, 2019, 5 pages.
U.S. Appl. No. 16/085,680 Examiner Interview Summary dated May 16, 2019, 5 pages.
U.S. Appl. No. 16/085,680 Supplemental Notice of Allowability dated May 24, 2019, 20 pages.
U.S. Appl. No. 16/085,680 Issue Fee Payment filed Jun. 10, 2019, 7 pages.
U.S. Appl. No. 16/085,680 Issue Notification dated Jul. 24, 2019, 1 page.
U.S. Appl. No. 16/538,068 Patent Application filed Aug. 12, 2019, 105 pages.
U.S. Appl. No. 16/538,068 Filing Receipt and Notice to File Missing Parts dated Aug. 23, 2019, 7 pages.
U.S. Appl. No. 16/538,068 Response to Notice to File Missing Parts dated Oct. 23, 2019, 6 pages.
U.S. Appl. No. 16/538,068 Updated Filing Receipt dated Oct. 25, 2019, 5 pages.
U.S. Appl. No. 16/538,068 Notice of Allowance and Allowability dated Jan. 29, 2020, 33 pages.
U.S. Appl. No. 16/538,068 Notice of Publication dated Jan. 30, 2020, 1 page.
U.S. Appl. No. 16/538,068 Issue Fee Payment filed Apr. 29, 2020, 8 pages.
U.S. Appl. No. 16/538,068 Issue Notification dated May 20, 2020, 1 page.
U.S. Appl. No. 16/862,351 Patent Application filed Apr. 29, 2020, 98 pages.
U.S. Appl. No. 16/862,351 Filing Receipt and Notice to File Missing Parts dated May 6, 2020, 9 pages.
PCT/US2017/031726 PCT Application filed May 9, 2017, 67 pages.
PCT/US2017/031726 Intl Search Report and Written Opinion dated Aug. 8, 2017, 67 pages.
PCT/US2017/031726 Intl Preliminary Report on Patentability dated Nov. 22, 2018, 67 pages.
CN201780042383 Office Action dated Apr. 28, 2020, 16 pages.
DE112017002374 DE Patent Application filed Nov. 8, 2018, 167 pages.
U.S. Appl. No. 15/590,562 Patent Application filed May 9, 2017, 130 pages.
U.S. Appl. No. 15/590,562 Filing Receipt and Informational Notice dated May 9, 2017, 7 pages.
U.S. Appl. No. 15/590,562 Notice of Publication dated Aug. 24, 2017, 1 page.
U.S. Appl. No. 15/590,562 Restriction Requirement dated Aug. 24, 2017, 7 pages.
U.S. Appl. No. 15/590,562 Response to Restriction Requirement and Preliminary Amendment dated Mar. 12, 2018, 15 pages.
U.S. Appl. No. 15/590,562 Non-final Office Action dated Sep. 20, 2018, 32 pages.
U.S. Appl. No. 15/590,562 Amendment filed Dec. 18, 2018, 26 pages.
U.S. Appl. No. 15/590,562 Applicant Summary of Interview with Examiner dated Mar. 22, 2019, 8 pages.
U.S. Appl. No. 15/590,562 Notice of Allowance and Allowability dated Apr. 5, 2019, 19 pages.
U.S. Appl. No. 15/590,562 Request to Change Applicant Name filed May 24, 2019, 13 pages.
U.S. Appl. No. 15/590,562 Updated Filing Receipt dated Jun. 3, 2019, 9 pages.
U.S. Appl. No. 15/590,562 Issue Fee Payment filed Jul. 3, 2019, 6 pages.
U.S. Appl. No. 15/590,562 Issue Notification dated Jul. 31, 2019, 1 page.
U.S. Appl. No. 16/456,060 Patent Application filed Jun. 28, 2019, 141 pages.
U.S. Appl. No. 16/456,060 Filing Receipt and Notice to File Missing Parts dated Jul. 12, 2019, 8 pages.
U.S. Appl. No. 16/456,060 Response to Notice to File Missing Parts and Preliminary Amendment filed Sep. 12, 2019, 13 pages.
U.S. Appl. No. 16/456,060 Updated Filing Receipt dated Sep. 17, 2019, 6 pages.
U.S. Appl. No. 16/456,060 Notice of Publication dated Dec. 26, 2019, 1 page.
U.S. Appl. No. 16/456,060 Non-final Office Action dated Jul. 20, 2020, 35 pages.
U.S. Appl. No. 12/437,599 Patent Application filed May 8, 2009, 61 pages.
U.S. Appl. No. 12/437,599 Filing Receipt dated May 8, 2009, 3 pages.
U.S. Appl. No. 12/437,599 Notice of Publication dated Nov. 12, 2009, 1 page.
U.S. Appl. No. 12/437,599 Non-final Office Action dated Oct. 19, 2011, 35 pages.
U.S. Appl. No. 12/437,599 Amendment filed Apr. 13, 2012, 21 pages.
U.S. Appl. No. 12/437,599 Notice of Allowance and Allowability dated May 22, 2012, 20 pages.
U.S. Appl. No. 12/437,599 Examiner Initialed Interview Summary dated May 22, 2012, 1 page.
U.S. Appl. No. 12/437,599 Issue Fee Payment filed May 25, 2012, 5 pages.
U.S. Appl. No. 12/437,599 Issue Notification dated Jun. 13, 2012, 1 page.
U.S. Appl. No. 13/487,781 Patent Application filed Jun. 4, 2012, 51 pages.
U.S. Appl. No. 13/487,781 Filing Receipt and Notice to File Missing Parts dated Jun. 18, 2012, 5 pages.
U.S. Appl. No. 13/487,781 Response to Notice to File Missing Parts dated Aug. 20, 2012, 4 pages.
U.S. Appl. No. 13/487,781 Updated Filing Receipt dated Aug. 29, 2012, 3 pages.
U.S. Appl. No. 13/487,781 Preliminary Amendment filed Aug. 30, 2012, 14 pages.
U.S. Appl. No. 13/487,781 Updated Filing Receipt dated Sep. 6, 2012, 4 pages.
U.S. Appl. No. 13/487,781 Preliminary Amendment filed Sep. 21, 2012, 6 pages.
U.S. Appl. No. 13/487,781 Notice of Publication dated Dec. 13, 2012, 1 page.
U.S. Appl. No. 13/487,781 Notice of Allowance and Allowability dated Sep. 4, 2013, 22 pages.
U.S. Appl. No. 13/487,781 Issue Fee Payment and 312 Amendment filed Dec. 4, 2013, 23 pages.
U.S. Appl. No. 13/487,781 Response to 312 Amendment dated Dec. 27, 2013, 6 pages.
U.S. Appl. No. 13/487,781 Issue Notification dated Jan. 15, 2014, 1 page.
U.S. Appl. No. 13/599,037 Patent Application filed Aug. 30, 2012, 59 pages.
U.S. Appl. No. 13/599,037 Filing Receipt dated Sep. 17, 2012, 4 pages.
U.S. Appl. No. 13/599,037 Preliminary Amendment dated Sep. 21, 2012, 5 pages.
U.S. Appl. No. 13/599,037 Notice of Publication dated Dec. 27, 2012, 1 page.

(56) References Cited

OTHER PUBLICATIONS

U.S. Appl. No. 13/599,037 e-Terminal Disclaimer filed and accepted Dec. 5, 2013, 7 pages.
U.S. Appl. No. 13/599,037 Notice of Allowance and Allowability dated Jan. 2, 2014, 26 pages.
U.S. Appl. No. 13/599,037 Issue Fee Payment dated Feb. 28, 2014, 8 pages.
U.S. Appl. No. 13/599,037 Issue Notification dated Mar. 26, 2014, 1 page.
U.S. Appl. No. 14/251,917 Patent Application filed Apr. 14, 2014, 63 pages.
U.S. Appl. No. 14/251,917 Filing Receipt dated May 5, 2014, 3 pages.
U.S. Appl. No. 14/251,917 Notice of Publication dated Aug. 14, 2014, 1 page.
U.S. Appl. No. 14/251,917 Notice of Allowance and Allowability dated Mar. 2, 2015, 23 pages.
U.S. Appl. No. 14/251,917 Amendment filed Apr. 22, 2015, 13 pages.
U.S. Appl. No. 14/251,917 Response to 312 Amendment filed Apr. 30, 2015, 3 pages.
U.S. Appl. No. 14/251,917 Issue Fee Payment filed May 1, 2015, 8 pages.
U.S. Appl. No. 14/251,917 Issue Notification dated May 1, 2015, 1 page.
U.S. Appl. No. 14/708,903 Patent Application filed May 11, 2015, 57 pages.
U.S. Appl. No. 14/708,903 Filing Receipt and Notice of Missing Parts filed May 19, 2015, 5 pages.
U.S. Appl. No. 14/708,903 Response to Notice of Missing Parts filed May 19, 2015, 3 pages.
U.S. Appl. No. 14/708,903 Notice of Publication dated Oct. 1, 2015, 1 page.
U.S. Appl. No. 14/708,903 Non-final Office Action filed Oct. 1, 2015, 36 pages.
U.S. Appl. No. 14/708,903 Amendment and e-Terminal Disclaimer filed Jan. 3, 2017, 23 pages.
U.S. Appl. No. 14/708,903 Notice of Allowance and Allowability dated Feb. 23, 2017, 31 pages.
U.S. Appl. No. 14/708,903 Issue Fee Payment filed Apr. 24, 2017, 7 pages.
U.S. Appl. No. 14/708,903 Issue Notification dated May 10, 2017, 1 page.
U.S. Appl. No. 14/708,903 Request for Certificate of Correction filed Apr. 14, 2018, 6 pages.
U.S. Appl. No. 14/708,903 Request for Certificate of Correction filed Apr. 14, 2018, 1 page.
U.S. Appl. No. 15/585,676 Patent Application filed May 3, 2017, 56 pages.
U.S. Appl. No. 15/585,676 Filing Receipt dated May 12, 2017, 4 pages.
U.S. Appl. No. 15/585,676 Notice of Publication dated Aug. 17, 2017, 1 page.
U.S. Appl. No. 15/585,676 Non-final Office Action dated Oct. 6, 2017, 34 pages.
U.S. Appl. No. 15/585,676 Amendment filed Apr. 5, 2018, 13 pages.
U.S. Appl. No. 15/585,676 Supplemental Amendment filed Apr. 5, 2018, 6 pages.
U.S. Appl. No. 15/585,676 Final Rejection dated Jul. 2, 2018, 9 pages.
U.S. Appl. No. 15/585,676 Notice of Abandonment dated Jan. 25, 2019, 2 pages.
PCT/US12/36455 PCT Application filed May 4, 2012, 59 pages.
PCT/US12/36455 International Search Report and Written Opinion dated Nov. 28, 2012, 7 pages.
PCT/US12/36455 International Preliminary Report on Patentability dated Nov. 5, 2013, 5 pages.
CN201280033387 First Search Report dated Jun. 24, 2015, 2 pages.
CN201280033387 First Office Action dated Jul. 2, 2015, 18 pages.
CN201280033387 Response to First Office Action dated Jan. 18, 2016, 11 pages.
CN201280033387.X Supplementary Search Report dated Mar. 29, 2016, 1 page.
CN201280033387 Second Office Action dated Apr. 7, 2016, 13 pages.
CN201280033387 Response to Second Office Action dated Aug. 18, 2016, 25 pages.
CN201280033387 Supplementary Search Report dated Jan. 16, 2017, 1 page.
CN201280033387 Third Office Action dated Apr. 7, 2016, 22 pages.
CN201280033387 Response to Third Office Action dated Jun. 1, 2017, 22 pages.
CN201280033387 Fourth Office Action dated Sep. 8, 2017, 24 pages.
CN201280033387 Response to Fourth Office Action dated Jan. 5, 2018, 11 pages.
CN201280033387 Decision to Grant CN Patent dated Jun. 6, 2018, 11 pages.
CN201280033387 Rectified Decision to Grant CN Patent dated Jun. 27, 2018, 4 pages.
CN201280033387 Certificate of Patent dated Sep. 21, 2018, 2 pages.
CN201810954743 CN Patent Application as filed Aug. 21, 2018, 59 pages.
CN201810954743 filed Aug. 21, 2018, 1 page.
CN201810954743 Notice of Publication dated Dec. 7, 2018, 33 pages.
CN201810954743 Search Report dated Dec. 19, 2019, 2 pages.
CN201810954743 First Office Action dated Dec. 30, 2019, 23 pages.
CN201810954743 Office Action dated Dec. 30, 2019, 24 pages.
CN201810954743 Response to First Office Action dated Jul. 14, 2020, 34 pages.
CN201810954743 Second Office Action dated Sep. 21, 2020, 21 pages.
EP12780024 EP Application as filed Dec. 3, 2013, 19 pages.
EP12780024 Notice of Publication dated Feb. 12, 2014, 1 page.
EP12780024 Search Report and Opinion dated Feb. 18, 2015, 7 pages.
EP12780024 Rule 70 Communication dated Mar. 6, 2015, 1 page.
EP12780024 Amendment dated Dec. 16, 2015, 13 pages.
EP12780024 Article 94 Communication dated Feb. 23, 2016, 7 pages.
EP12780024 Amendment in Response to Article 94 Communication dated Aug. 10, 2016, 23 pages.
EP12780024 Article 94 Communication dated Jan. 3, 2017, 5 pages.
EP12780024 Amendment in Response to Article 94 Communication dated Jun. 8, 2017, 5 pages.
EP12780024 Intention to Grant dated Feb. 7, 2018, 103 pages.
EP12780024 Request for Correction/Amendment of Granted Claims dated Mar. 13, 2018, 103 pages.
EP12780024 Approval/Grant of Request for Correction/Amendment of Granted Claims dated Mar. 13, 2018, 3 pages.
EP12780024 Revised Intention to Grant dated Jul. 4, 2018, 99 pages.
EP12780024 Decision to Grant dated Jul. 19, 2018, 2 pages.
EP12780024 Patent Certificate dated Aug. 15, 2018, 2 pages.
EP18188795 EP Patent Application as filed Aug. 13, 2018, 62 pages.
EP18188795 European Search Report dated Sep. 26, 2018, 3 pages.
EP18188795 Extended European Search Report and Opinion dated Oct. 9, 2018, 8 pages.
EP18188795 Notice of Publication dated Dec. 12, 2018, 2 pages.
EP18188795 Amendment and Request for Examination dated Jun. 17, 2019, 28 pages.
EP18188795 Article 94(3) Communication dated Nov. 11, 2019, 7 pages.
EP18188795 Amendment / Response to 94(3) Objection dated Aug. 21, 2020, 7 pages.
KR20137032399 KR Patent Application filed May 12, 2013, 136 pages.

(56) References Cited

OTHER PUBLICATIONS

KR20137032399 Request for Amendment of Inventor Information dated Dec. 13, 2013, 2 pages.
KR20137032399 Amendment of Biographic Data dated Dec. 23, 2013, 4 pages.
KR20137032399 Office Action dated Nov. 18, 2014, 8 pages.
KR20137032399 Amendment to Claims dated Jan. 15, 2015, 21 pages.
KR20137032399 Response to Office Action dated Jan. 15, 2015, 15 pages.
KR20137032399 Final Office Action dated May 22, 2015, 5 pages.
KR20137032399 Amendment dated Jun. 17, 2015, 6 pages.
KR20137032399 Response to Final Office Action dated Jun. 17, 2015, 5 pages.
KR20137032399 Grant of Patent dated Jun. 24, 2015, 2 pages.
KR20137032399 Patent Certificate dated Sep. 23, 2015, 2 pages.
KR20157016195 KR Divisional Application filed Jun. 17, 2015, 126 pages.
KR20157016195 Request for Amendment of Inventor Information dated Jul. 2, 2015, 2 pages.
KR20157016195 Amendment of Bibliographic Data dated Jul. 3, 2015, 4 pages.
KR20157016195 Amendment dated Feb. 29, 2015, 13 pages.
KR20157016195 Amendment dated Apr. 13, 2017, 15 pages.
KR20157016195 Request for Examination dated Apr. 20, 2017, 2 pages.
KR20157016195 Office Action dated Jul. 5, 2017, 9 pages.
KR20157016195 Final Office Action dated Dec. 20, 2017, 9 pages.
PCT/US16/22040 PCT Application filed Mar. 11, 2016, 71 pages.
PCT/US16/22040 International Search Report and Written Opinion dated Jun. 20, 2016, 10 pages.
PCT/US16/22040 Article 19 Amendment dated Sep. 22, 2016, 10 pages.
PCT/US16/22040 International Preliminary Report on Patentability dated Sep. 19, 2017, 7 pages.
CN201680027105.3 CN Application as filed Nov. 9, 2017, 167 pages.
CN201680027105.3 First Office Action dated May 7, 2019, 22 pages.
CN201680027105.3 Response to First Office Action dated Nov. 22, 2019, 25 pages.
CN201680027105.3 Second Office Action dated Mar. 18, 2020, 12 pages.
CN201680027105.3 Response to Second Office Action dated Aug. 3, 2020, 31 pages.
DE112016001188 DE Application filed Sep. 13, 2017, 172 pages.
JP2017567041 JP Application filed Sep. 12, 2017, 68 pages.
JP2017567041 Office Action dated May 25, 2020, 30 pages.
KR20177029575 KR Application filed Oct. 13, 2017, 169 pages.
KR20177029575 Request for Amendment to Signatory dated Oct. 23, 2017, 2 pages.
KR20177029575 Allowed Amendment to Signatory dated Dec. 11, 2017, 4 pages.
TW105107546 TW Application filed Mar. 11, 2016, 65 pages.
CN 201780030693 CN Patent Application filed Nov. 16, 2018, 129 pages.
CN 201780030693 Office Action dated Apr. 28, 2020, 15 pages.
KR 10-2018-7030031 KR Patent Application filed Oct. 17, 2018, 169 pages.
CN201780042383 CN Patent Application filed Jan. 7, 2019, 275 pages.

* cited by examiner

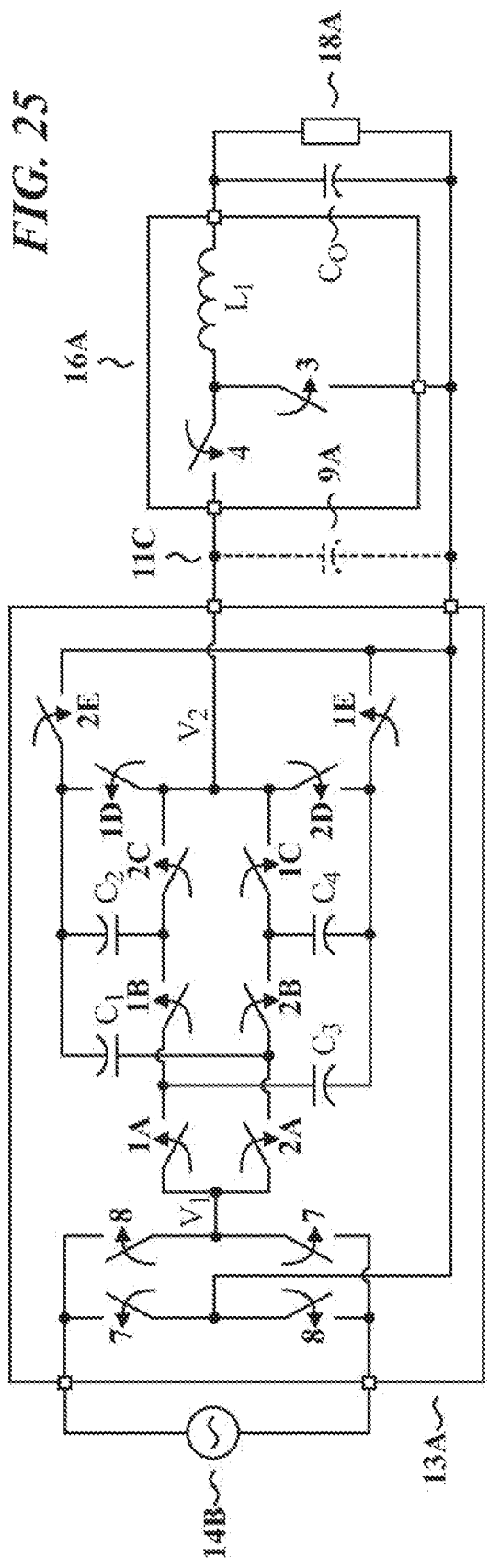
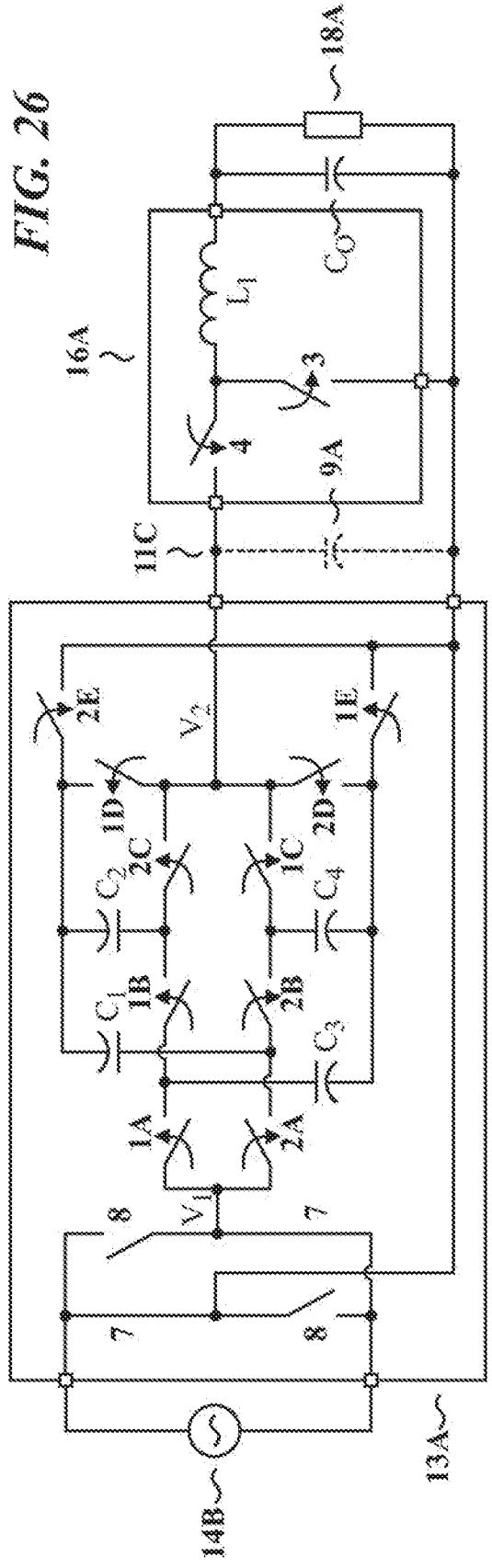

POWER CONVERTER WITH MODULAR STAGES CONNECTED BY FLOATING TERMINALS

CROSS REFERENCE TO RELATED APPLICATIONS

This application is a continuation of U.S. application Ser. No. 16/444,428, filed Jun. 18, 2019, which is a continuation of U.S. application Ser. No. 15/618,481, filed Jun. 9, 2017, now U.S. Pat. No. 10,326,358, which is a continuation of U.S. application Ser. No. 15/138,692, filed on Apr. 26, 2016, now U.S. Pat. No. 9,712,051, which is a continuation of U.S. application Ser. No. 14/513,747, filed on Oct. 14, 2014, now U.S. Pat. No. 9,362,826, which is a continuation of U.S. application Ser. No. 13/771,904, filed on Feb. 20, 2013, now U.S. Pat. No. 8,860,396, which is a continuation of International Application No. PCT/US2012/036455, filed on May 4, 2012, which claims the benefit of the priority date of U.S. Provisional Application No. 61/482,838, filed on May 5, 2011; U.S. Provisional Application No. 61/548,360, filed on Oct. 18, 2011; and U.S. Provisional Application No. 61/577,271, filed on Dec. 19, 2011. The content of these applications is hereby incorporated by reference in its entirety.

FIELD OF DISCLOSURE

This disclosure relates to power supplies, and in particular to power converters.

BACKGROUND

Many power converters include switches and one or more capacitors that are used, for example, to power portable electronic devices and consumer electronics. Switch-mode power converters regulate the output voltage or current by switching energy storage elements (i.e. inductors and capacitors) into different electrical configurations using a switch network. Switched capacitor converters are switch-mode power converters that primarily use capacitors to transfer energy. In such converters, the number of capacitors and switches increases as the transformation ratio increases. Switches in the switch network are usually active devices that are implemented with transistors. The switch network may be integrated on a single or on multiple monolithic semiconductor substrates, or formed using discrete devices.

Typical DC-DC converters perform voltage transformation and output regulation. This is usually done in a single-stage converter such as a buck converter. However it is possible to split these two functions into two specialized stages, namely a transformation stage, such as a switching network, and a separate regulation stage, such as a regulating circuit. The transformation stage transforms one voltage into another, while the regulation stage ensures that the voltage and/or current output of the transformation stage maintains desired characteristics.

For example, referring to FIG. 1, in one converter 10, a switching network 12A is connected to a voltage source 14 at an input end thereof. An input of a regulating circuit 16A is then connected to an output of the switching network 12A. A load 18A is then connected to an output of the regulating circuit 16A. Power flows between the voltage source 14 and the load 18A in the direction indicated by the arrows. Such a converter is described in US Patent Publication 2009/0278520, filed on May 8, 2009, the contents of which are herein incorporated by reference.

SUMMARY

In one aspect, the invention features an apparatus for electric power conversion. Such an apparatus includes a converter having an input terminal and an output terminal. The converter includes a regulating circuit having an inductance, and switching elements connected to the inductance. These switching elements are controllable to switch between switching configurations. The regulating circuit maintains an average DC current through the inductance. The converter also includes a switching network having an input port and an output port. This switching network includes charge storage elements and switching elements connected to the charge storage elements. These switching elements are controllable to switch between switch configurations. In one switch configuration, the switching elements form a first arrangement of charge storage elements in which a charge storage element is charged through one of the input port and the output port of the switching network. In another configuration, the switching elements form a second arrangement of charge storage elements in which a charge storage element is discharged through one of the input port and output port of the switching network. The switching network and regulating circuit also satisfy at least one of the following configurations: (1) the regulating circuit is connected between the output terminal of the converter and the switching network, the switching network being an adiabatically charged switching network; (2) the regulating circuit is connected between the output terminal of the converter and the switching network, wherein either the switching network is a multiphase switching network, the switching network and the regulating circuit are bidirectional, or the regulator circuit is multi-phase; (3) the regulating circuit is connected between the input terminal of the converter and an input port of the switching network, the switching network being an adiabatically charged switching network; (4) the regulating circuit is connected between the input terminal of the converter and an input port of the switching network, and either the switching network is a multiphase switching network, the switching network and the regulating circuit are bidirectional, or the regulator circuit is multi-phase; (5) the switching circuit is connected between the regulating circuit and an additional regulating circuit; or (6) the regulating circuit is connected between the switching network and an additional switching network.

Embodiments of the invention include those in which the switching network includes a reconfigurable switching network and those in which the switching network includes a multi-phase switching network.

Other embodiments include those in which the regulating circuit includes a bidirectional regulating circuit those in which the regulating circuit includes a multi-phase regulating circuit, those in which the regulating circuit is bidirectional and includes a switch-mode power converter, those in which the regulating circuit is bidirectional regulating circuit and includes a resonant power converter, those in which the regulating circuit is connected to an output of the switching network, and those in which the regulating circuit is connected between the output terminal of the converter and the switching network, the switching network being an adiabatically charged switching network.

In other embodiments, the regulating circuit is connected between the output terminal of the converter and a switching network, and either the switching network is a multi-phase switching network, the switching network and the regulating circuit are bidirectional, or the regulator circuit is multi-phase.

In other embodiments, the regulating circuit is connected between the input terminal of the converter and an input port of the switching network, the switching network being an adiabatically charged switching network.

In yet other embodiments, the regulating circuit is connected between the input terminal of the converter and an input port of the switching network, and either the switching network is a multi-phase switching network, the switching network and the regulating circuit are bidirectional, or the regulator circuit is multi-phase.

Among the embodiments of the invention are those in which the switching circuit is connected between the regulating circuit and an additional regulating circuit, and those in which the regulating circuit is connected between the switching network and an additional switching network.

In additional embodiments, the switching circuit is configured as an AC switching circuit. Among these embodiments are those that also include a power-factor correction circuit connected to the AC switching circuit. Among these embodiments are those in which this power-factor correction circuit is connected between the AC switching circuit and the regulating circuit.

In another aspect, the invention features an apparatus including a converter having an input terminal and an output terminal. The converter includes a switching network having an input port and output port. This switching network includes charge storage elements, and switching elements connected to the charge storage elements. The switching elements are controllable to arrange the charge storage elements into a selected configuration. In at least one configuration, the switching elements form a first group of charge storage elements for discharging the charge storage elements through the output port of the switching network. In another, the switching elements form a second group of charge storage elements for charging the charge storage elements through the input port of the switching network. The converter also includes a bi-directional regulating circuit connected between at least one of an input terminal of the converter and an input port of the switching network and an output terminal of the converter and an output port of the switching network.

In some embodiments, the switching network includes a multi-phase switching network.

Also included among the embodiments are those in which the bidirectional regulating circuit includes a buck/boost circuit and those in which the bidirectional regulating circuit includes a split-pi circuit.

In another aspect, the invention features a converter having an input terminal and an output terminal. The converter includes a switching network having an input port and output port, charge storage elements, and switching elements connected to the charge storage elements for arranging the charge storage elements into one of a plurality of configurations. In one configuration, the switching elements form a first group of charge storage elements for discharging the charge storage elements through the output port of the switching network. In another configuration, the switching elements form a second group of charge storage elements for charging the charge storage elements through the input port of the switching network. The converter further includes a regulating circuit configured to provide a stepped-up voltage and connected between the output terminal of the converter and an output port of the switching network.

In yet another aspect, the invention features an apparatus having an input terminal and output terminal, and a switching network having an input port and output port, charge storage elements, and switching elements connected to the charge storage elements. The switching elements are controllable for causing the switching elements to be arranged in a plurality of configurations. In one configuration, the switching elements form a first group of charge storage elements for discharging the charge storage elements through the output port of the switching network. In another configuration the switching elements form a second group of charge storage elements for charging the charge storage elements through the input port of the switching network. The apparatus further includes a source regulating circuit connected between an input terminal of the converter and an input port of the switching network.

Some embodiments also include a load regulating circuit connected between an output terminal of the converter and an output port of the switching network.

In another aspect, the invention features a manufacture including multiple switching networks and regulating circuits having inputs and outputs that permit modular interconnections thereof for assembly of a DC-DC converter.

In some embodiments, at least one switching network includes a switched capacitor network. Among these are those in which the switched capacitor network includes an adiabatically charged switched capacitor network. These embodiments also include those in which the adiabatically charged switched capacitor network includes a cascade multiplier. In some of these embodiments, the cascade multiplier is driven by complementary clocked current sources.

In other embodiments, at least one regulating circuit includes a linear regulator.

Embodiments also include those in which the DC-DC converter includes series-connected switched capacitor networks, and those in which the DC-DC converter includes multiple regulating circuits that share a common switching network.

These and other features of the invention will be apparent from the following detailed description and the accompanying figures, in which:

DESCRIPTION OF THE FIGURES

FIG. 25 shows a particular implementation of the AC-DC converter illustrated in FIG. 24;

FIG. 26 shows the AC-DC converter illustrated in FIG. 25 during the positive portion of the AC cycle:

DETAILED DESCRIPTION

Figure 1:
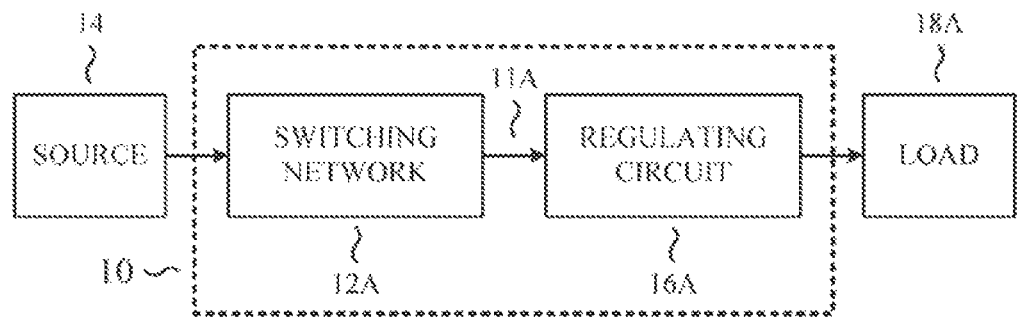
FIG. 1 shows a known DC-DC converter with separate regulating circuit and switching network.
Figure 1A:
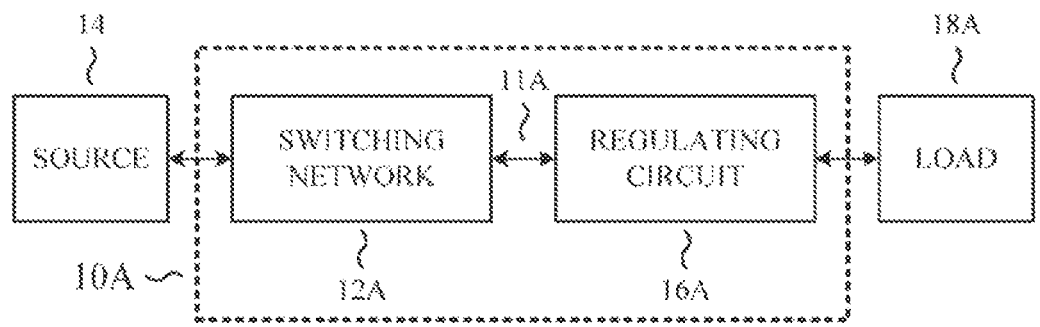
FIG. 1A shows a bidirectional version of FIG. 1.

Embodiments described herein rely at least in part on the recognition that in a multi-stage DC-DC converter, a switching network and a regulating circuit can be made essentially modular and can be mixed and matched in a variety of different ways. This provides a transformative integrated power solution (TIPS™) for the assembly of such converters. As such, the configuration shown in FIG. 1 represents only one of multiple ways to configure one or more switching networks 12A with one or more regulating circuits 16A. FIG. 1A shows a bidirectional version of FIG. 1, where power can flow either from a voltage source 14 to a load ISA or from the load 18A to the voltage source 14 as indicated by the arrows.

There are two fundamental elements described in connection with the following embodiments: switching networks and regulating circuits. Assuming series connected elements of the same type are combined, there are a total of four basic building blocks. These are shown FIGS. 1-4. The embodiments disclosed herein include at least one of the four basic building blocks shown in FIGS. 1-4.

Additional embodiments further contemplate the application of object-oriented programming concepts to the design of DC-DC converters by enabling switching networks 12A and regulating circuits 16A to be "instantiated" in a variety of different ways, so long as their inputs and outputs continue to match in a way that facilitates modular assembly of DC-DC converters having various properties.

The switching network 12A in many embodiments is instantiated as a switching capacitor network. Among the more useful switched capacitor topologies are: Ladder, Dickson, Series-Parallel, Fibonacci, and Doubler, all of which can be adiabatically charged and configured into multi-phase networks. A particularly useful switching capacitor network is an adiabatically charged version of a full-wave cascade multiplier. However, diabatically charged versions can also be used.

As used herein, changing the charge on a capacitor adiabatically means causing an amount of charge stored in that capacitor to change by passing the charge through a non-capacitive element. A positive adiabatic change in charge on the capacitor is considered adiabatic charging while a negative adiabatic change in charge on the capacitor is considered adiabatic discharging. Examples of non-capacitive elements include inductors, magnetic elements, resistors, and combinations thereof.

In some cases, a capacitor can be charged adiabatically for part of the time and diabatically for the rest of the time. Such capacitors are considered to be adiabatically charged. Similarly, in some cases, a capacitor can be discharged adiabatically for part of the time and diabatically for the rest of the time. Such capacitors are considered to be adiabatically discharged.

Diabatic charging includes all charging that is not adiabatic and diabatic discharging includes all discharging that is not adiabatic.

As used herein, an adiabatically charged switching network is a switching network having at least one capacitor that is both adiabatically charged and adiabatically discharged. Adiabatically charged switching network is a switching network that is not an adiabatically charged switching network.

The regulating circuit 16A can be instantiated as any converter with the ability to regulate the output voltage. A buck converter for example, is an attractive candidate due to its high efficiency and speed. Other suitable regulating circuits 16A include boost converters, buck/boost converters, fly-back converters, Cuk converters, resonant converters, and linear regulators.

Figure 2:
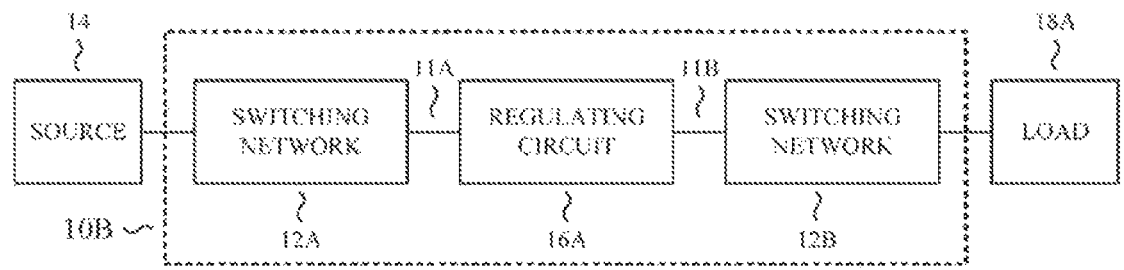
FIGS. 2-4 show DC-DC converters with alternate configurations of regulating circuits and switching networks.

In one embodiment, shown in FIG. 2, a voltage source 14 provides an input to a first switching network 12A, which is instantiated as a switched capacitor network. The output of the first switching network 12A is a lower voltage than the input voltage that is provided to a regulating circuit 16A (e.g. a buck, a boost, or a buck/boost converter). This regulating circuit 16A provides a regulated input voltage to a second switching network 12B, such as another switched capacitor network. A high voltage output of this second switching network 12B is then applied to a load 18A.

An embodiment such as that shown in FIG. 2 can be configured to regulate the load 18A or to regulate the source 14 depending on the direction of energy flow.

Figure 3:
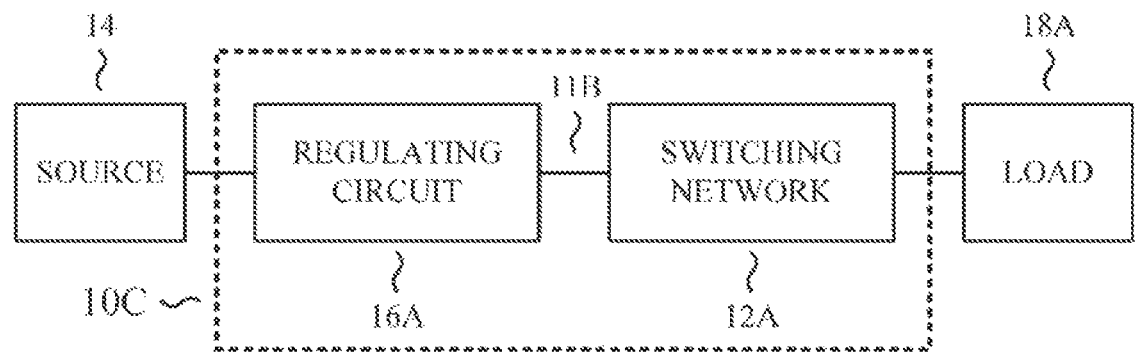

In another embodiment, shown in FIG. 3, a low voltage source 14 connects to an input of a regulating circuit 16A, the output of which is provided to an input of a switching network 12A to be boosted to a higher DC value. The output of the switching network is then provided to a load 18A.

An embodiment such as that shown in FIG. 3 can be used to regulate the source 14 or the load 18A depending on the direction of energy flow.

Figure 4:
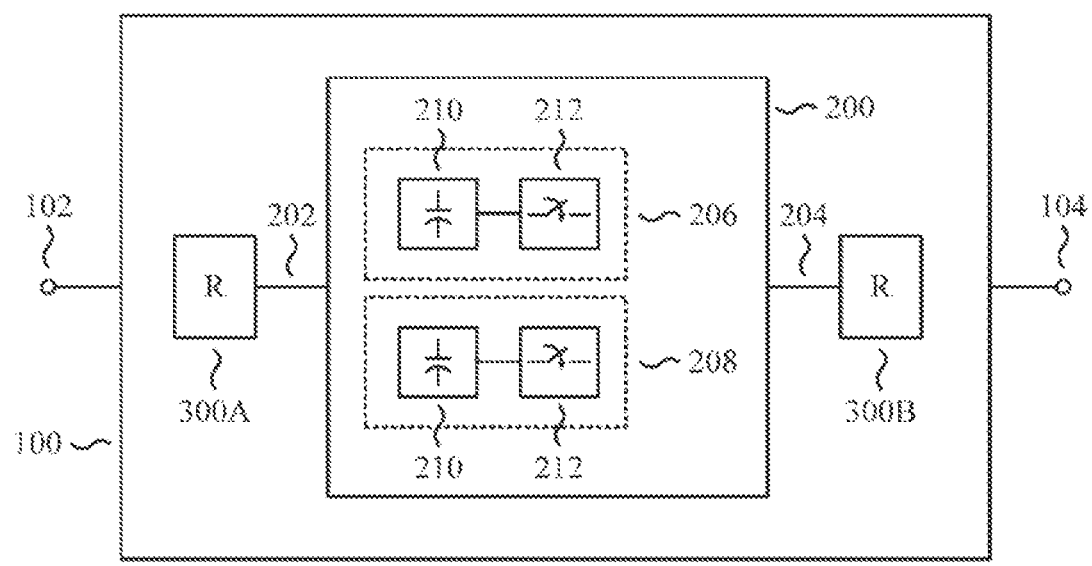

Referring now to FIG. 4, another embodiment of a converter 100 includes a first regulating circuit 300A connected to an input 102 thereof and a second regulating circuit 300B connected to an output 104 thereof. Between the first and second regulating circuits 300A, 300B is a switching network 200 having an input 202 and an output 204. The switching network includes charge storage elements 210 interconnected by switches 212. These charge storage elements 210 are divided into first and second groups 206, 208.

Figure 5:
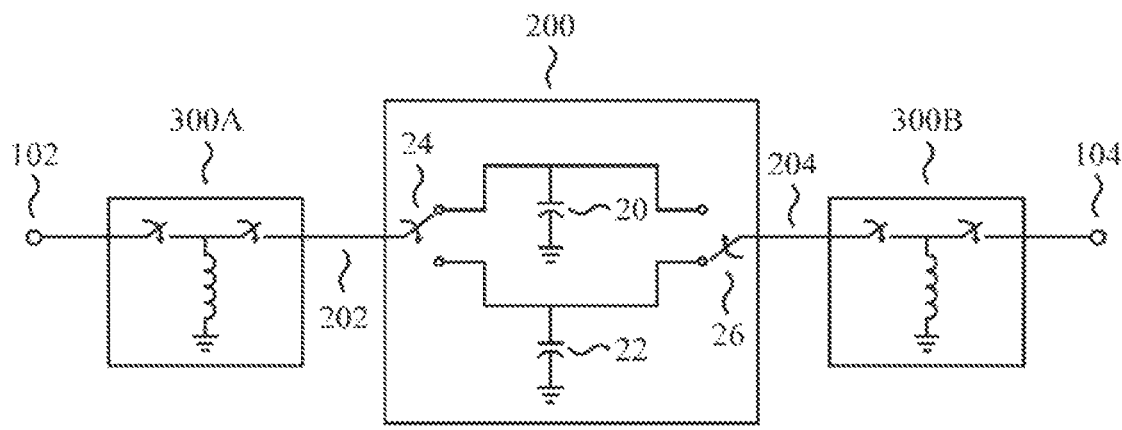
FIG. 5 shows a particular implementation of the power converter illustrated in FIG. 4.

In some embodiments, the switching network 200 can be a bidirectional switching capacitor network such as that shown in FIG. 5. The switching capacitor network in FIG. features a first capacitor 20 and a second capacitor 22 in parallel. A first switch 24 selectively connects one of the first and second capacitors 20, 22 to a first regulating circuit 300A, and a second switch 26 selectively connects one of the first and second capacitors 20, 22 to the second regulating circuit 300B. Both the first and second switches 24, 26 can be operated at high frequency, thus facilitating the adiabatic charging and discharging of the first and second capacitors 20, 22.

The particular embodiment shown in FIG. 5 has a two-phase switching network 200. However, other types of switching networks can be used instead.

Figure 6:
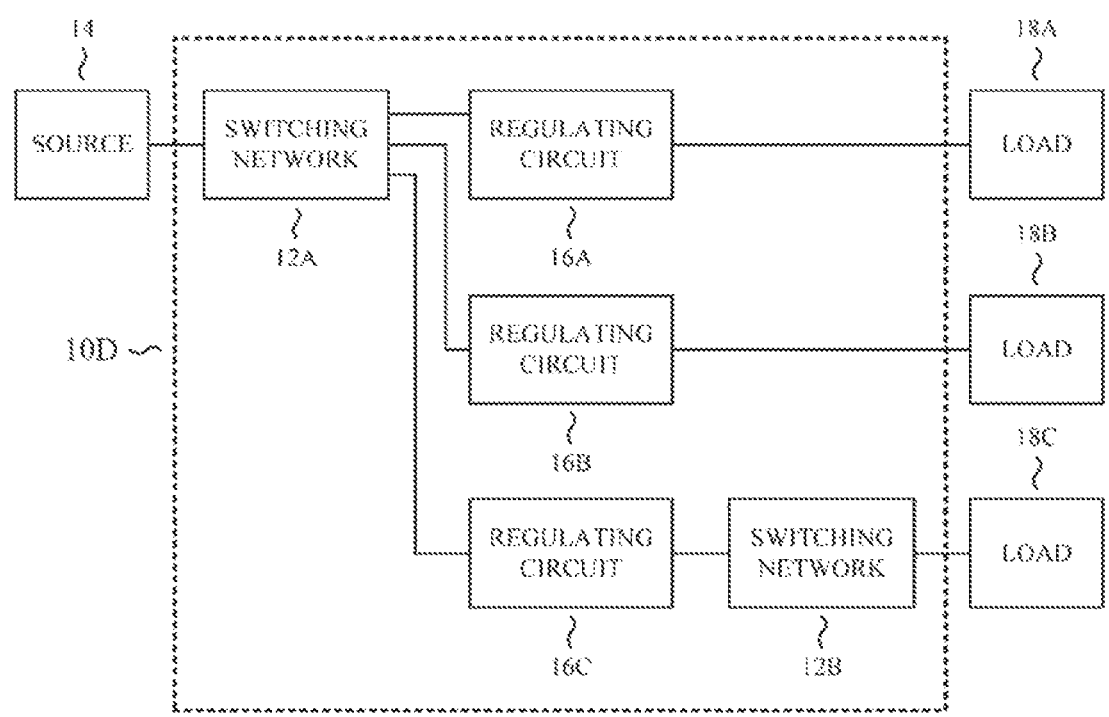
FIG. 6 shows an embodiment with multiple regulating circuits.

In yet another embodiment, shown in FIG. 6, multiple regulating circuits 16A, 16B, 16C are provided at an output of a first switching network 12A for driving multiple loads 18A-18C. For one of the loads 18C, a second switching network 12B is provided between the load 18C and the corresponding regulating circuit 16C thus creating a pathway similar to that shown in FIG. 2. FIG. 6 thus provides an example of how the modular construction of regulating circuits and switching networks facilitates the ability to mix and match components to provide flexibility in DC-DC converter construction.

A switched capacitor (SC) DC-DC power converter includes a network of switches and capacitors. By cycling the network through different topological states using these switches, one can transfer energy from an input to an output of the SC network. Some converters, known as "charge pumps," can be used to produce high voltages in FLASH and other reprogrammable memories.

Figure 7:
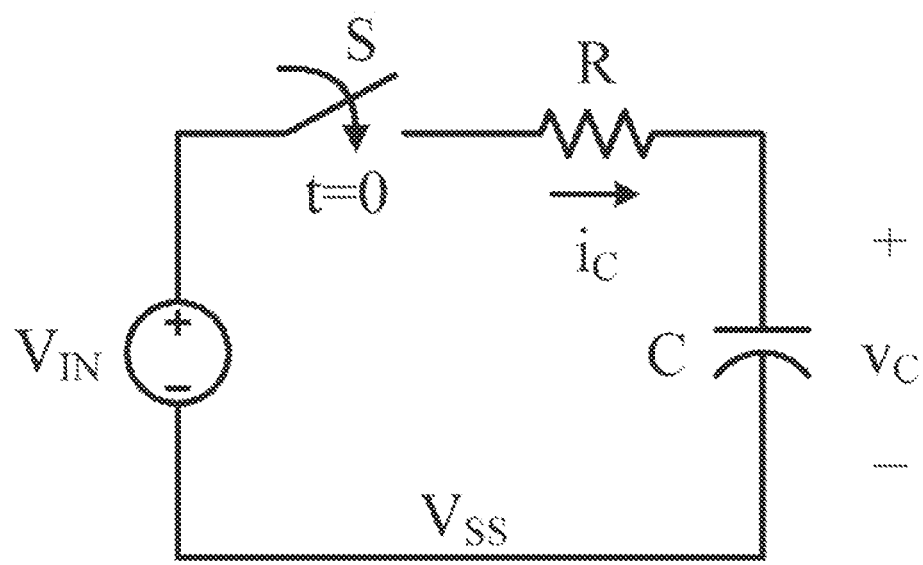
FIG. 7 shows an RC circuit.

FIG. 7 shows a capacitor C initially charged to some value $V_C(0)$. At t=0 the switch S is closed. At that instant, a brief surge of current flows as the capacitor C charges to its final value of $V_{in}$. The rate of charging can be described by a time constant $\tau$=RC, which indicates the time it takes the voltage to either rise or fall to within 1/e of its final value. The exact capacitor voltage $v_c(t)$ and current $i_c(t)$ are given by the following equations:

$$v_c(t) = v_c(0) + [V_{in} - v_c(0)](1 - e^{-t/RC}), \text{ and} \quad (1.1)$$

$$i_c(t) = C\frac{dv_c}{dt} = \frac{V_{in} - v_c(0)}{R} e^{-t/RC}. \quad (1.2)$$

The energy loss incurred while charging the capacitor can be found by calculating the energy dissipated in resistor R, which is $$E_{loss}(t) = \int_{t=0}^{\infty} i_R(t) \times v_R(t) \quad (1.3)$$

$$dt = \int_{t=0}^{\infty} [i_c(t)]^2 R \, dt.$$

The equation can be further simplified by substituting the expression for $i_c(t)$ from equation (1.2) into equation (1.3). Evaluating the integral then yields $$E_{loss}(t) = \frac{1}{2}[V_{in} - v_c(0)]^2 C[1 - e^{-2t/RC}].$$

If the transients are allowed to settle (i.e. t→∞), the total energy loss incurred in charging the capacitor is independent of its resistance R. In that case, the amount of energy loss is equal to $$E_{loss}(\infty) = \frac{1}{2} C \Delta v_c^2$$

Figure 8:
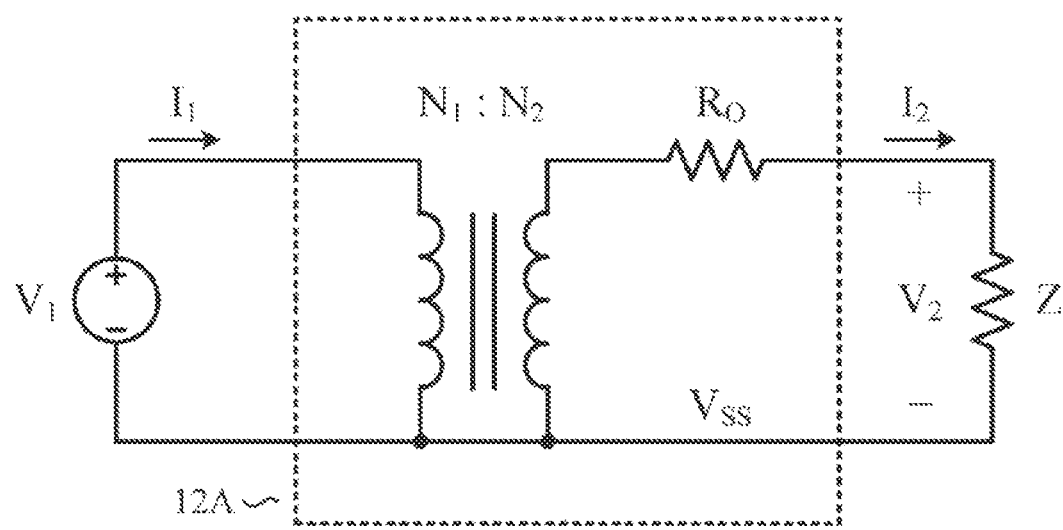
FIG. 8 shows a model of a switched capacitor DC-DC converter.

A switched capacitor converter can be modeled as an ideal transformer, as shown in FIG. 8, with a finite output resistance $R_o$ that accounts for the power loss incurred in charging or discharging of the energy transfer capacitors, as shown in FIG. 8. This loss is typically dissipated in the ON resistance of the MOSFETs and equivalent series resistance of the capacitors.

The output voltage of the switched-capacitor converter is given by $$V_o = V_{in}\frac{N_2}{N_1} - I_o R_o$$

There are two limiting cases where the operation of the switched capacitor converters can be simplified and $R_o$ easily found. These are referred to as the "slow-switching limit" and the "fast-switching limit."

In the fast-switching limit ($\tau \gg T_{sw}$), the charging and discharging currents are approximately constant, resulting in a triangular AC ripple on the capacitors. Hence, $R_o$ is sensitive to the series resistance of the MOSFETs and capacitors, but is not a function of the operating frequency. In this case, the output resistance of the converter operating in the fast-switching limit is a function of parasitic resistance.

In the slow-switching limit, the switching period $T_{sw}$ is much longer than the RC time constant $\tau$ of the energy transfer capacitors. Under this condition, systemic energy loss irrespective of the resistance of the capacitors and switches. This systemic energy loss arises in part because the root mean square (RMS) of the charging and discharging current is a function of the RC time constant. If the effective resistance $R_{eff}$ of the charging path is reduced (i.e. reduced RC), the RMS current increases and it so happens that the total charging energy loss ($E_{loss} = I_{RMS}^2 R_{eff} = \frac{1}{2} C \times \Delta V_{C2}$) is independent of $R_{eff}$. One solution to minimize this energy loss is to increase the size of the pump capacitors in the switched capacitor network.

It is desirable for a switching capacitor network to have a common ground, large transformation ratio, low switch stress, low DC capacitor voltage, and low output resistance. Among the more useful topologies are: Ladder, Dickson, Series-Parallel, Fibonacci, and Doubler.

Figure 9A:
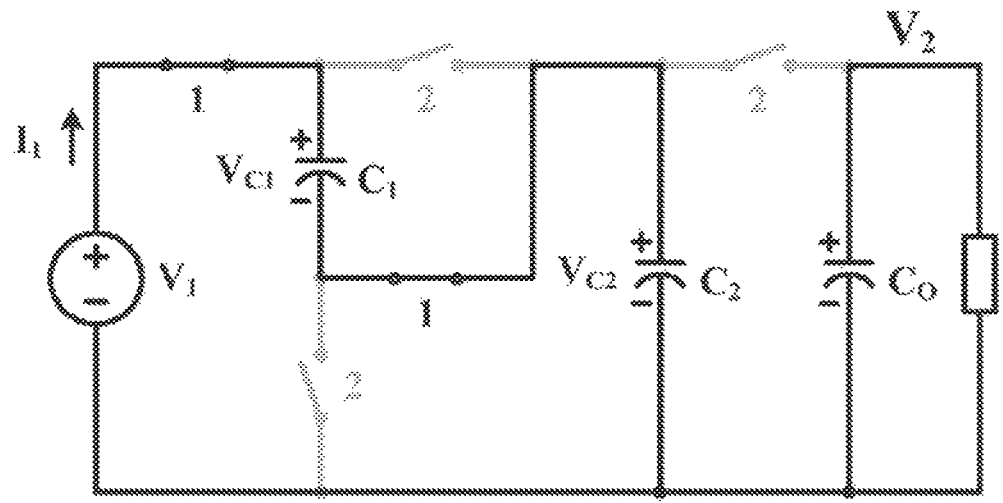
FIGS. 9A and 9B show a series-parallel SC converter operating in charge phase and discharge phase respectively.
Figure 9B:
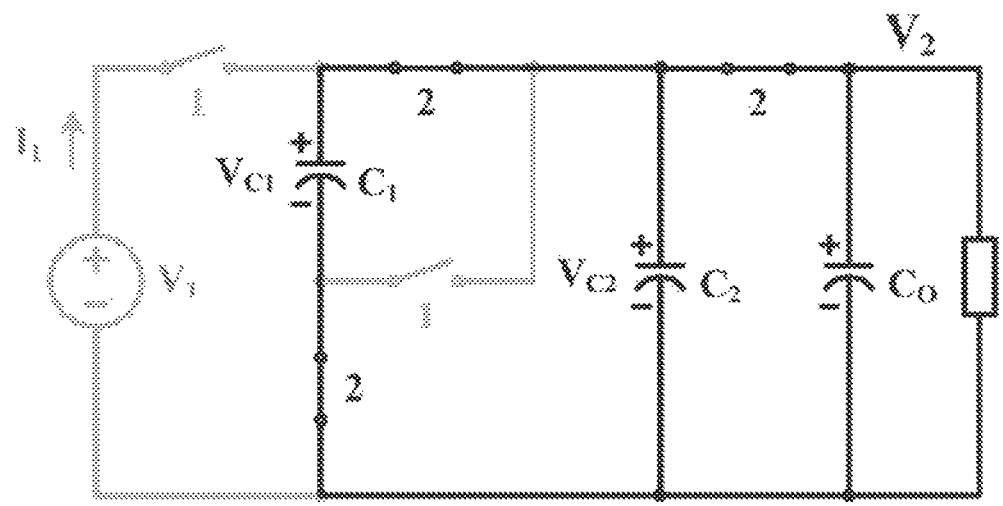

One useful converter is a series-parallel switched capacitor converter. FIGS. 9A and 9B show a 2:1 series-parallel switched capacitor converter operating in charge phase and in discharge phase, respectively. During the charge phase, the capacitors are in series. In the discharge phase, the capacitors are in parallel. In its charge phase, capacitor voltages $v_{C1}$ and $v_{C2}$ add up to $V_1$ while in its discharge phase, $v_{C1}$ and $v_{C2}$ equal $V_2$, which means that $V_2=V_1/2$.

Figure 10:
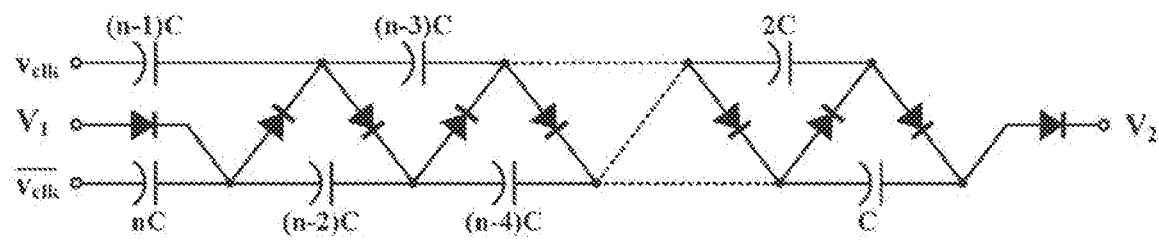
FIG. 10 shows a series pumped symmetric cascade multiplier with diodes.
Figure 11:
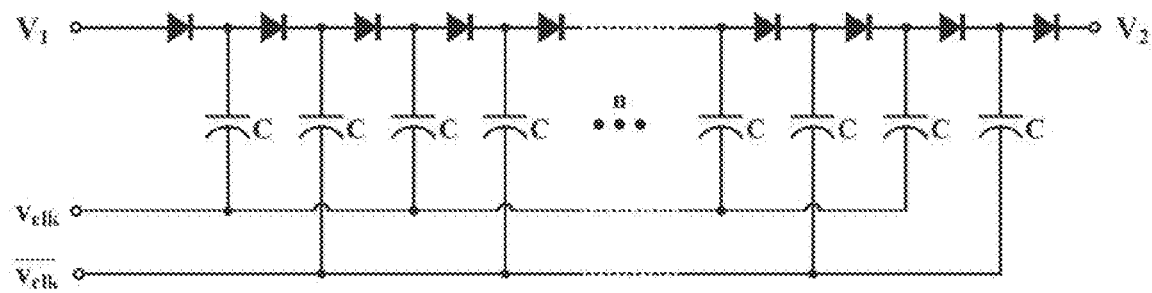
FIG. 11 shows a parallel pumped symmetric cascade multiplier with diodes.
Figure 12:
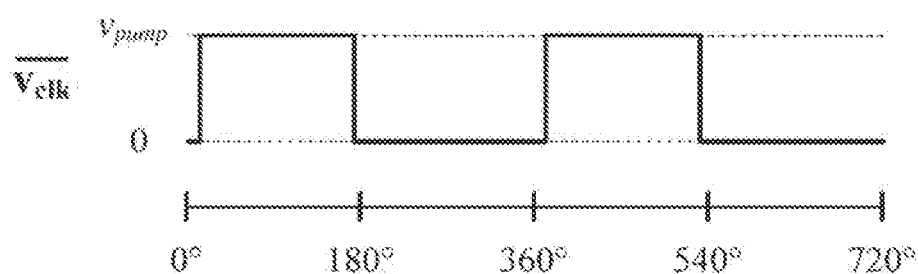
FIG. 12 shows charge pump signals.

Other useful topologies are cascade multiplier topologies, as shown in FIGS. 10 and 11. In both charge pumps, the source is located at $V_1$ and the load is located at $V_2$. In these types of charge pumps, packets of charge are pumped along a diode chain as the coupling capacitors are successively charged and discharged. As shown in FIG. 12, clock signals $v_{clk}$ and $\overline{v_{clk}}$ with amplitude $v_{pump}$ are 180 degrees out of phase. The coupling capacitors can either be pumped in series or parallel.

It takes n clock cycles for the initial charge to reach the output. The charge on the final pump capacitor is n times larger than the charge on the initial pump capacitor and thus the output voltage $V_2$ for the converters is $V_1+(n-1)\times v_{pump}$ in both pumping configurations.

Although the foregoing topologies are suitable for stepping up voltage, they can also be used to step down voltage by switching the location of the source and the load. In such cases, the diodes can be replaced with controlled switches such as MOSFETs and BJTs.

Figure 13:
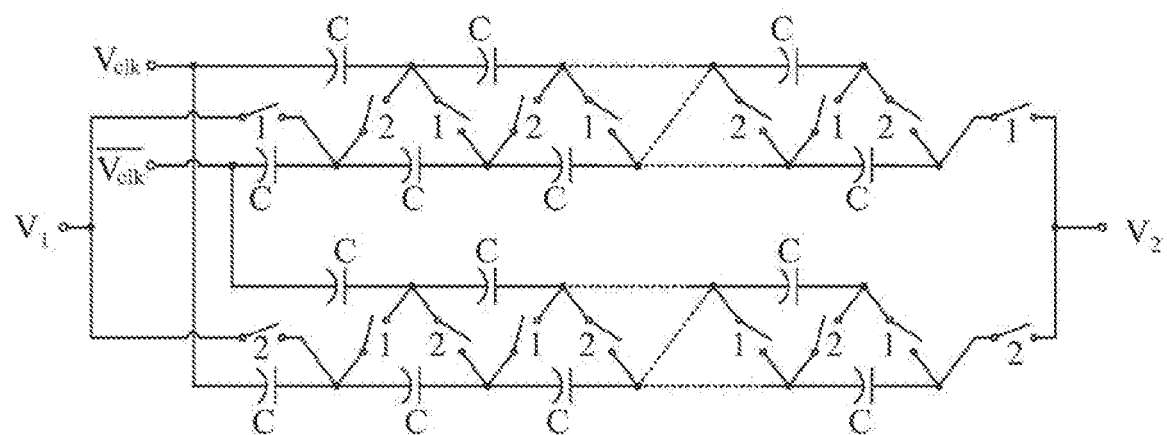
FIG. 13 shows a two-phase symmetric series pumped cascade multiplier with switches.
Figure 14:
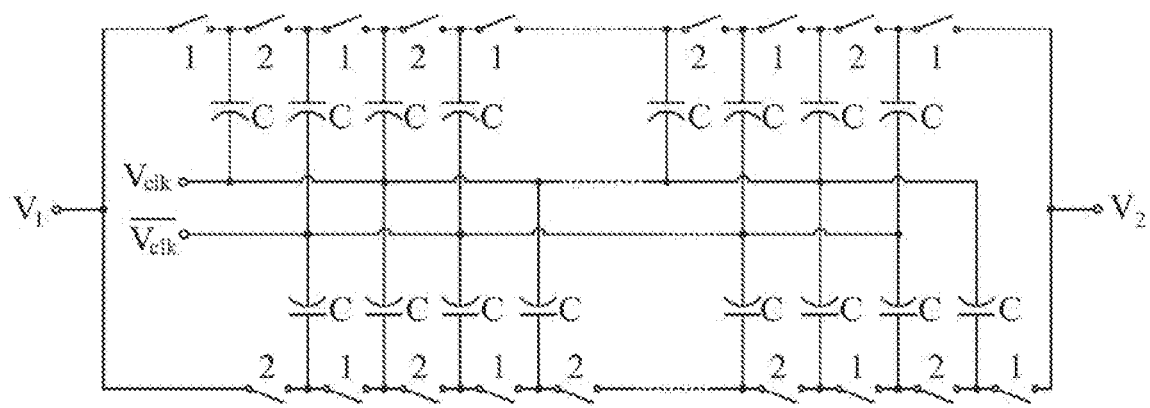
FIG. 14 shows a two-phase symmetric parallel pumped cascade multiplier with switches.
Figure 15:
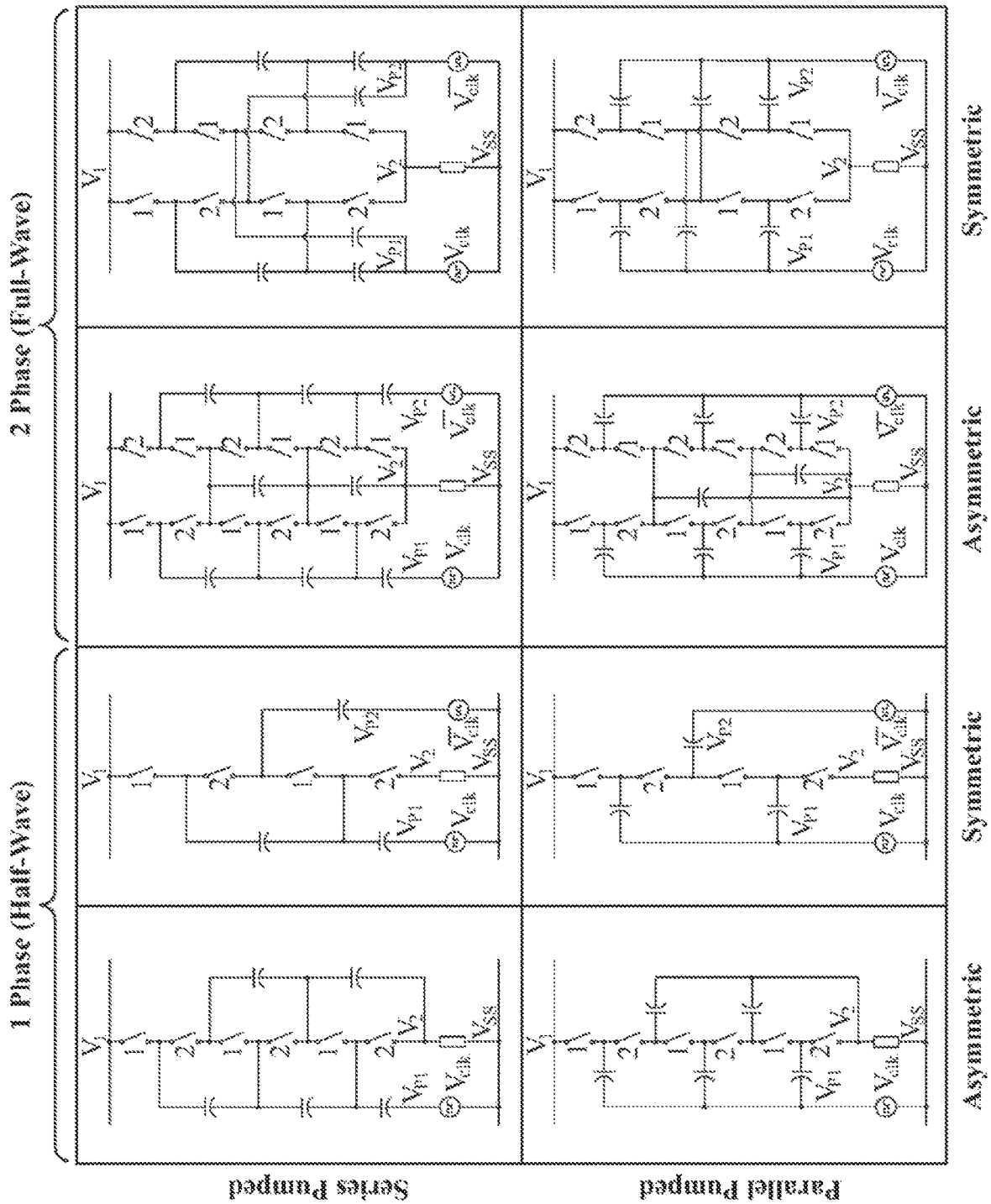
FIG. 15 shows four different cascade multipliers along with corresponding half-wave versions.

The foregoing cascade multipliers are half-wave multipliers in which charge is transferred during one phase of the of the clock signal. This causes a discontinuous input current. Both of these cascade multipliers can be converted into full-wave multipliers by connecting two half-wave multipliers in parallel and running the half-wave multipliers 180 degrees out of phase. FIG. 13 shows a full-wave symmetric series pumped cascade multiplier version while FIG. 14 shows a full-wave symmetric parallel pumped cascade multiplier version. Unlike the diodes in the half-multiplier, the switches in FIG. 13 and FIG. 14 are bidirectional. As a result, in both of these cascade multipliers, power can flow either from the source to the load or from the load to the source. Asymmetric multipliers can also be converted into full-wave multipliers FIG. 15 shows four different step-up versions of full-wave symmetric multipliers along with their corresponding half-wave versions. Furthermore, it is possible to combine N phases in parallel and run them 180 degrees/N out of phase to reduce output voltage ripple and increase output power handling capability.

The basic building blocks in the modular architecture shown FIGS. 1-4 can either be connected as independent entities or coupled entities. In the situation where the switching networks and regulating circuits are tightly coupled, it is possible to prevent and/or reduce the systemic energy loss mechanism of the switching networks through adiabatic charging. This generally includes using a regulating circuit to control the charging and discharging of the capacitors in the switching network. Furthermore, the output voltage of the regulating circuit and thus the total converter can be regulated in response to external stimuli. One approach to regulating the output voltage is by controlling the average DC current in the magnetic storage element.

A desirable feature of a regulating circuit is to limit the root mean square (RMS) current through the capacitors in the switching network. To do that, the regulating circuit uses either resistive or magnetic storage elements. Unfortunately, resistive elements would consume power so their use is less desirable. Therefore, embodiments described herein rely on a combination of switches and a magnetic storage element in the regulating circuit. The regulating circuit limits the RMS current by forcing the capacitor current through a magnetic storage element in a regulating circuit that has an average DC current. The switches in the regulating circuit are operated so as to maintain an average DC current through the magnetic storage element.

The regulating circuit may limit both the RMS charging current and the RMS discharging current of at least one capacitor in the switching network. A single regulating circuit may limit the current in or out of switching network by sinking and/or sourcing current. Therefore, there are four fundamental configurations, which are shown in FIGS. 1-4. Assuming power flows from source to load then, in FIG. 1, regulating circuit 16A may sink both the charging and discharging current of switching network 12A. In FIG. 3, regulating circuit 16A may source both the charging and discharging current of switching network 12A. In FIG. 4, regulating circuit 300A may source the charging current of switching network 200 and regulating circuit 300B may sink the discharging current of the same switching network 200 and vice-versa. In FIG. 2, regulating circuit 16A may source both the charging and discharging current of switching network 12B while also sinking both the charging and discharging current of switching network 12A. Furthermore, if both the switching networks and regulating circuits allow power to flow in both directions then bidirectional power flow is possible (source to load and load to source).

One embodiment relies on at least partially adiabatically charging full-wave cascade multipliers. Cascade multipliers are a preferred switching network because of their superior fast-switching limit impedance, ease of scaling up in voltage, and low switch stress.

Figure 16:
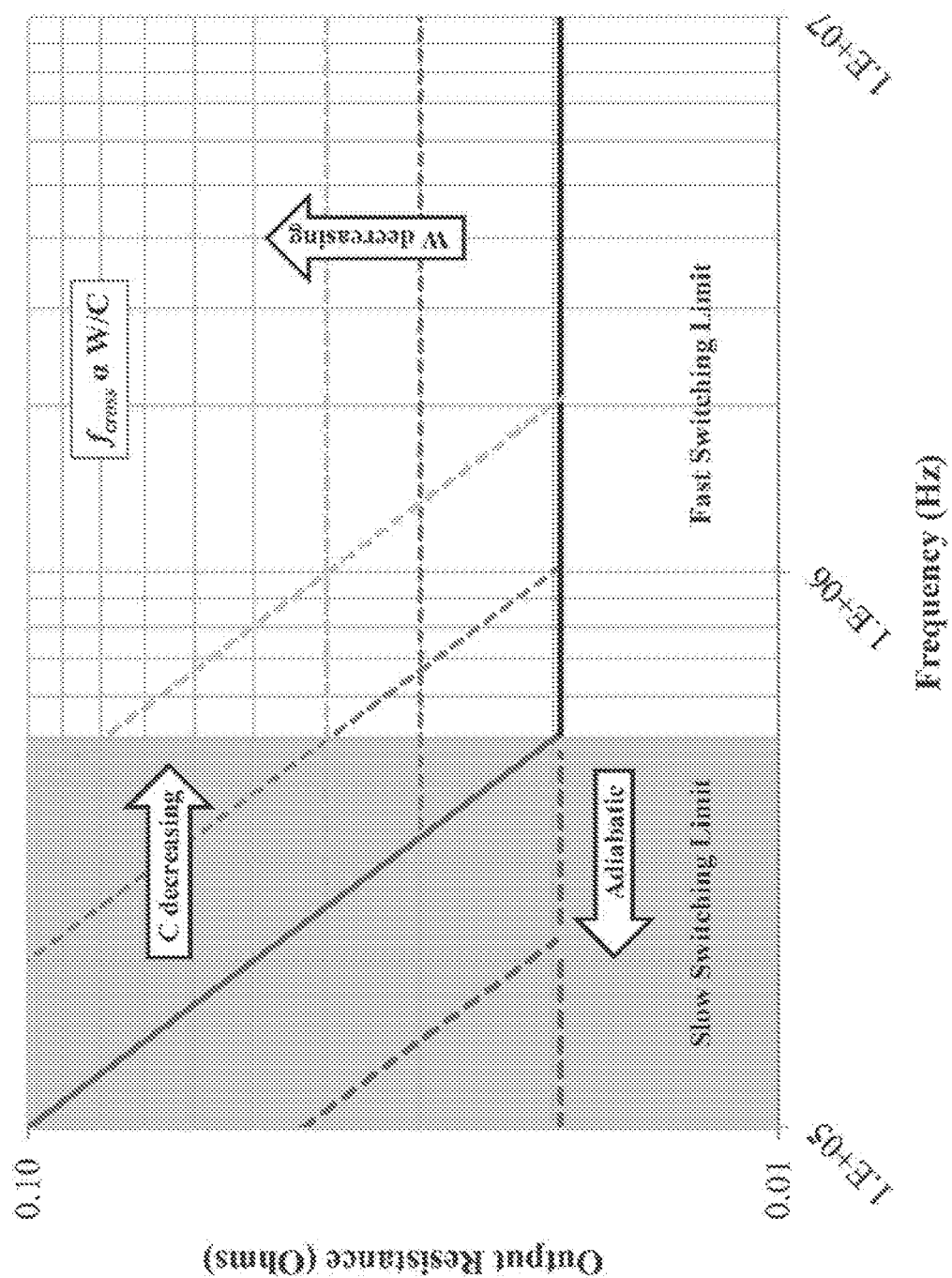
FIG. 16 shows output impedance of a switched-capacitor converter as a function of frequency.

In cascade multipliers, the coupling capacitors are typically pumped with a clocked voltage source $v_{clk}$ & $\overline{v_{clk}}$. However, if the coupling capacitors are pumped with a clocked current source $i_{clk}$ & $\overline{i_{clk}}$ instead, then the RMS charging and discharging current in the coupling capacitor may be limited. In this case, the capacitors are at least partially charged adiabatically thus lowering, if not eliminating, the $\frac{1}{2}C\times\Delta V c^2$ loss that is associated with a switched capacitor converter when operated in the slow-switching limit. This has the effect of lowering the output impedance to the fast-switching limit impedance. As shown by the black dotted line in FIG. 16, which depicts adiabatic operation under full adiabatic charging, the output impedance would no longer be a function of switching frequency.

With all else being equal, an adiabatically charged switched-capacitor converter can operate at a much lower switching frequency than a conventionally charged switched capacitor converter, but at higher efficiency. Conversely, an adiabatically charged switched-capacitor converter can operate at the same frequency and with the same efficiency as a conventionally charged switched-capacitor converter, but with much smaller coupling capacitors, for example between four and ten times smaller.

Figure 17:
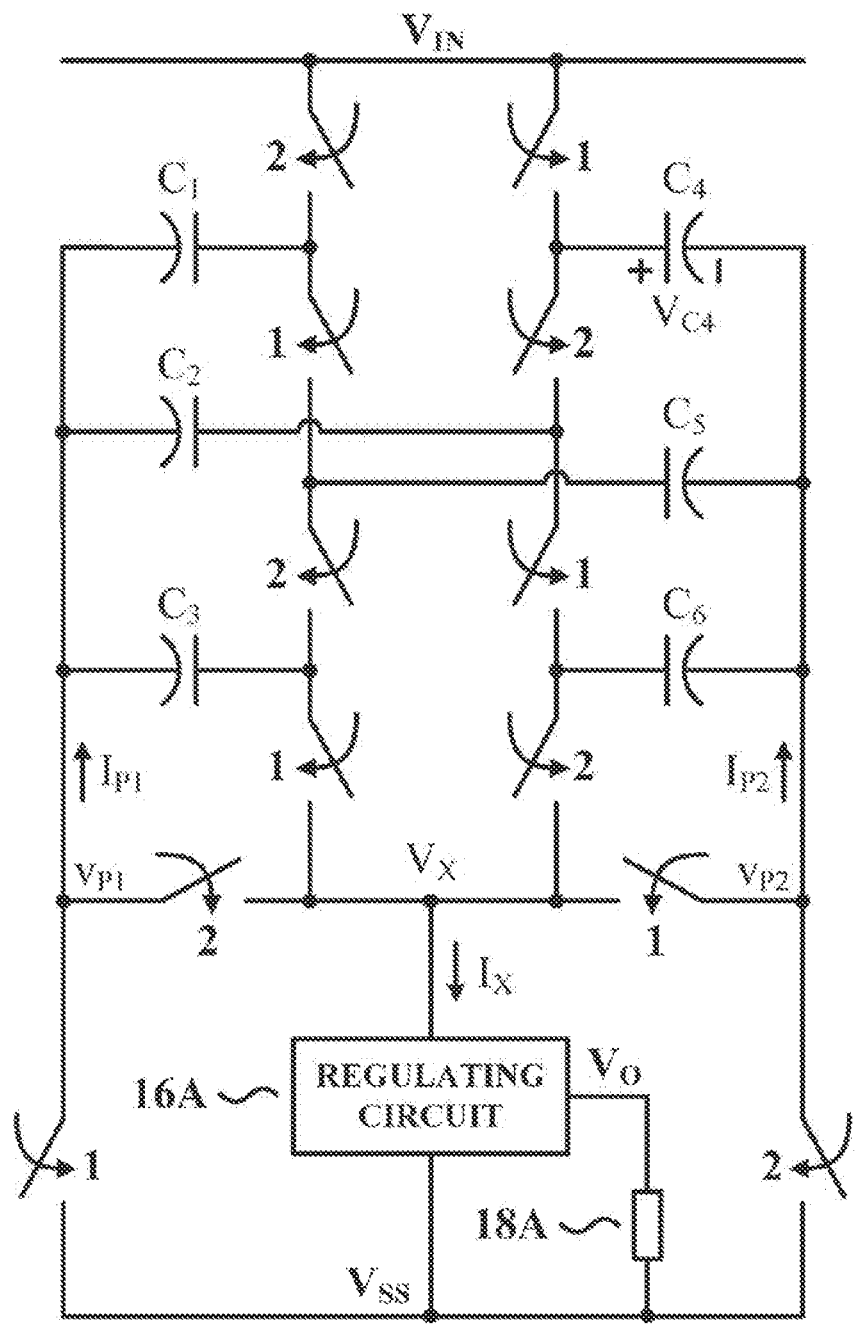
FIG. 17 shows a particular implementation of the DC-DC converter illustrated in FIG. 1A with a full-wave adiabatically charged switching network.

FIG. 17 shows a step-down converter consistent with the architecture shown in FIG. 1A. However, in this embodiment, the switching network 12A is adiabatically charged using the regulating circuit 16A. The clocked current sources $i_{clk}$ & $\overline{i_{clk}}$ are emulated by four switches and regulating circuit 16A. The output capacitor $C_O$ has also been removed so as to allow $V_X$ to swing. In this example, the regulating circuit 16A is a boost converter that behaves as constant source with a small AC ripple. Any power converter that has a non-capacitive input impedance would have allowed adiabatic operation. Although switch-mode power converters are attractive candidates due to their high efficiency, linear regulators are also practical.

Figure 18:
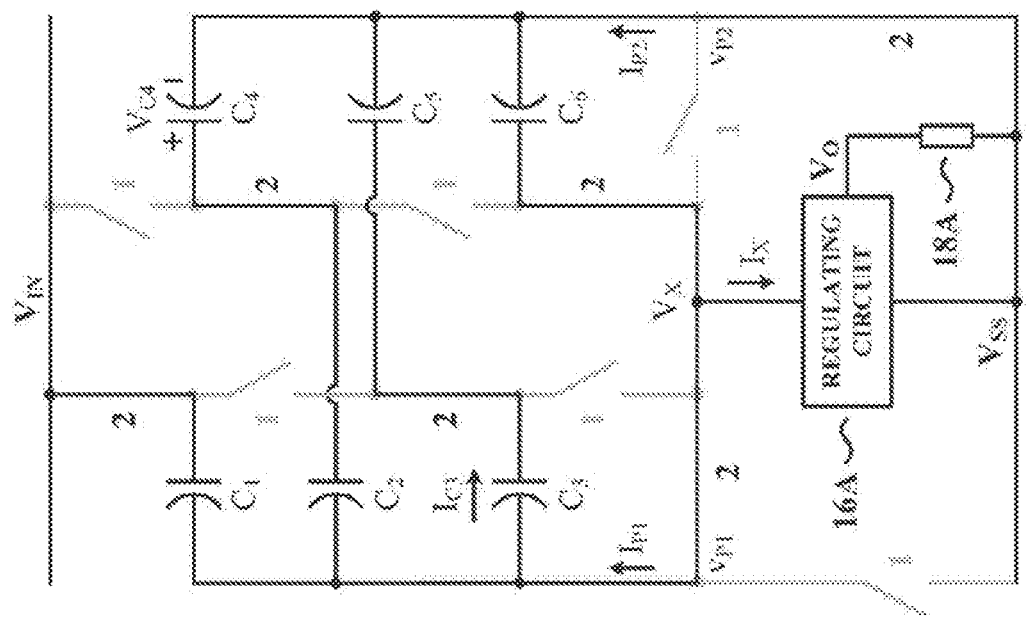
FIG. 18 shows the DC-DC converter illustrated in FIG. 17 during phase A.
Figure 19:
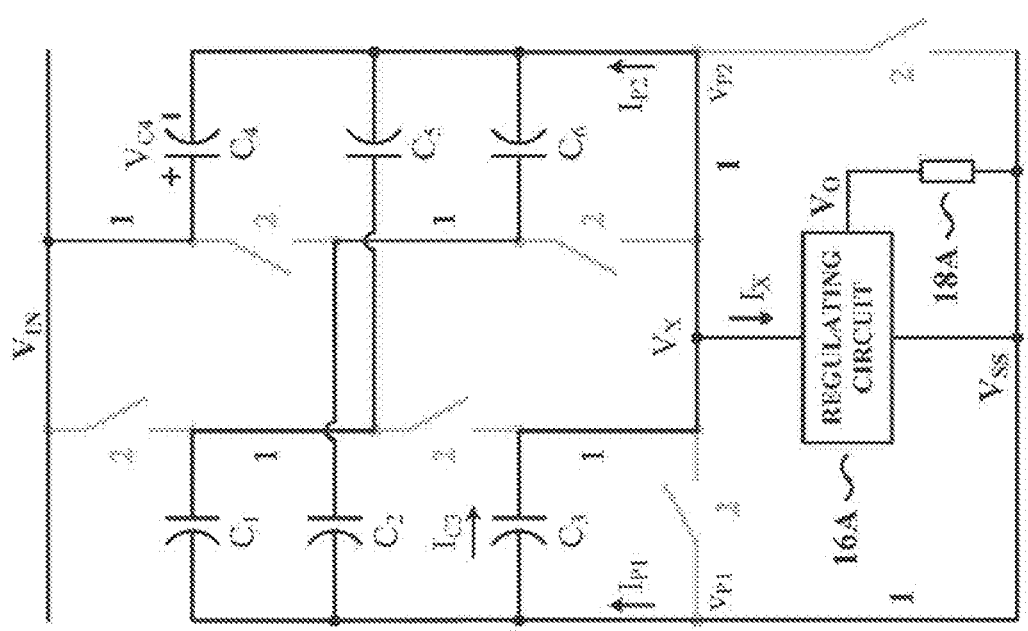
FIG. 19 shows the DC-DC converter illustrated in FIG. 17 during phase B.

In operation, closing switches labeled 1 charges capacitors $C_4$, $C_5$, and $C_6$ while discharging capacitors $C_1$, $C_2$ and $C_3$. Similarly, closing switches 2 has the complementary effect. The first topological state (phase A) is shown in FIG. 18, where all switches labeled 1 are closed and all switches labeled 2 are opened. Similarly, the second topological state (phase B) is shown in FIG. 19, where all switches labeled 2 are closed and all switches labeled 1 are opened. In this embodiment, the regulating circuit 16A limits the RMS charge and discharging current of each capacitor. For example, capacitor $C_3$ is discharged through the filter inductor in regulating circuit 16A during phase A, while capacitor $C_3$ is charged through the filter inductor in regulating circuit 16A during phase B, clearly demonstrating the adiabatic concept. Furthermore, all of the active components are implemented with switches so the converter can process power in both directions.

Figure 20:
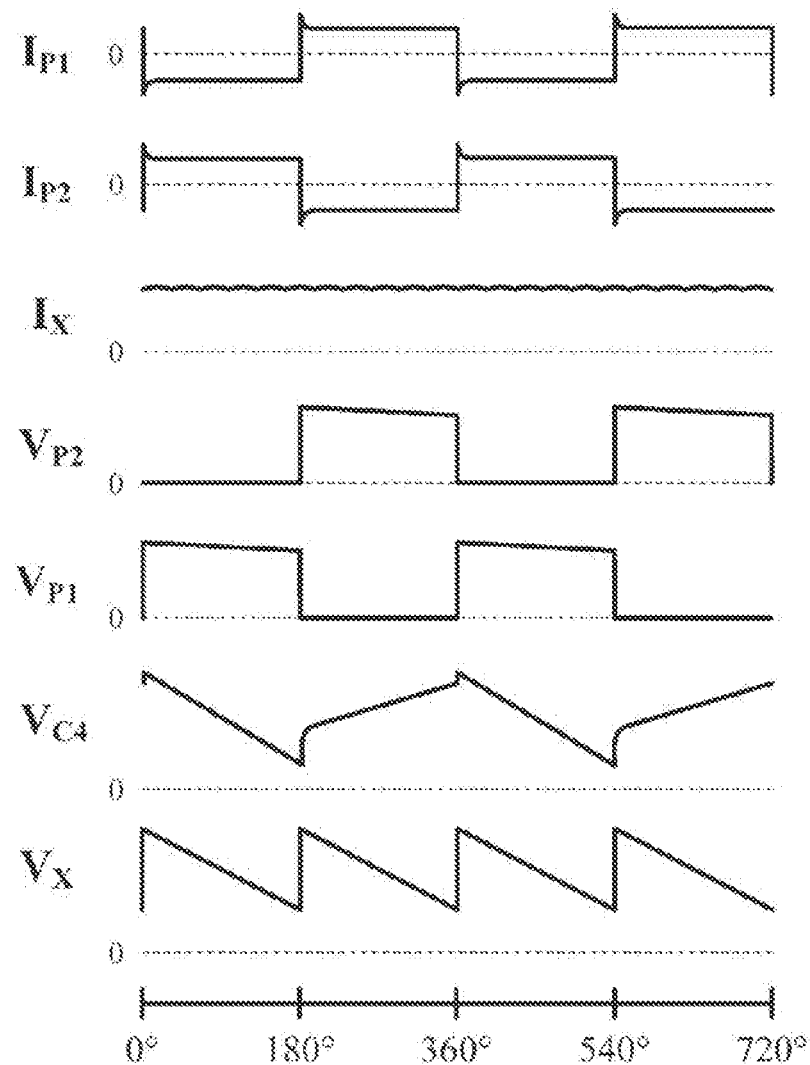
FIG. 20 shows various waveforms associated with a 4:1 adiabatically charged converter.

A few representative node voltages and currents are shown in FIG. 20. There is a slight amount of distortion on the rising and falling edges of the two illustrated currents ($I_{P1}$ and $I_{P2}$), but for the most part, the currents resemble two clocks 180 degrees out of phase. In general, adiabatic charging occurs in cascade multipliers if at least one end of a switch stack is not loaded with capacitance, as is the case in this embodiment, where the $V_X$ node is loaded down by the regulating circuit 16A.

The modular architecture with the basic building blocks shown in FIGS. 1-4 may be expanded to cover a wider range of applications, such as high-voltage DC, AC-DC, buck-boost, and multiple output voltages. Each of these applications includes separating the transformation and regulation functions. Extension of the architecture can also incorporate adiabatically charged switched capacitors converters.

Figure 21:
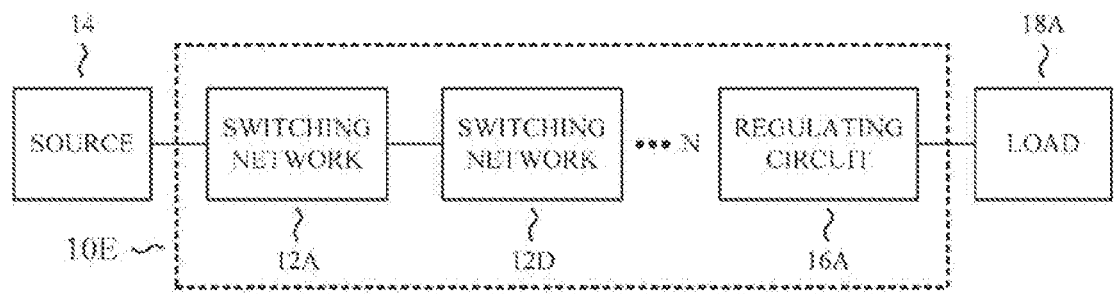
FIG. 21 shows adiabatic charging of series connected stages.

In many switched-capacitor converters, the number of capacitors and switches increases linearly with the transformation ratio. Thus, a large number of capacitors and switches are required if the transformation ratio is large. Alternatively, a large transformation ratio can be achieved by connecting numerous low gain stages in series as depicted in FIG. 21. The transformation ratio of the total switch capacitor stack ($V_{in}/V_x$) is as follows:

$$\frac{V_{in}}{V_x} = N_1 \times N_2 \ldots N_n \quad (2.1)$$

The main disadvantage of the series stacked configuration is that the voltage stresses on the front stages are much higher than those of the rear stages. This will normally require stages with different voltage ratings and sizes.

Adiabatic charging of a preceding series-connected switching network only occurs if the following switching network controls the charging and discharging current of the preceding stage. Thus, it is preferable to use full-wave switched-capacitor converters in the front stages or to use switched-capacitor stages such as the single-phase series-parallel switched-capacitor converters with magnetic based filters.

Figure 22:
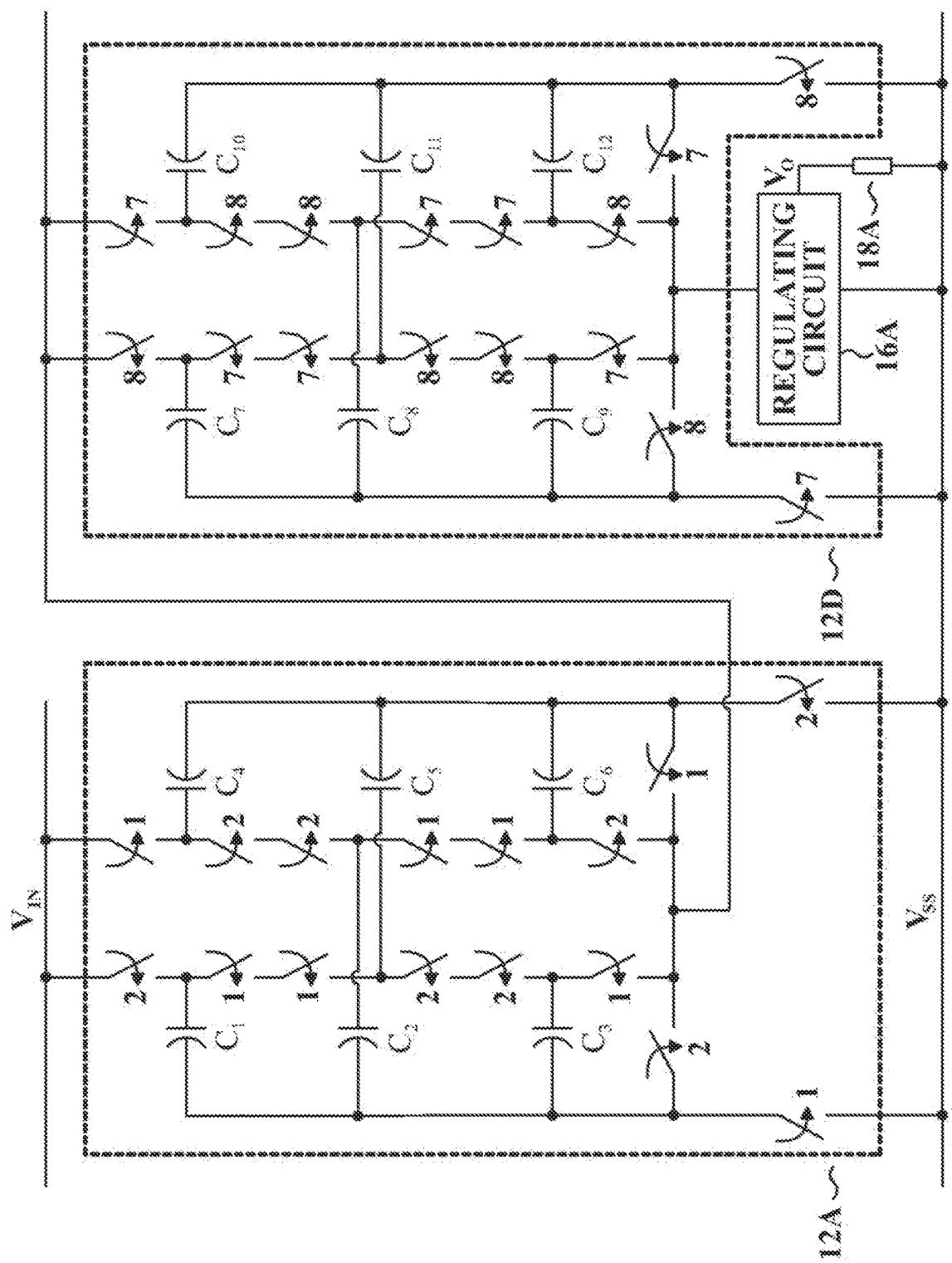
FIG. 22 shows a particular implementation of the power converter illustrated in FIG. 21.

FIG. 22 shows a converter with two series-connected switching networks consistent with the architecture shown in FIG. 21. Both switching networks 12A and 12D are two-phase cascade multipliers. In operation, switches labeled 1 and 2 are always in complementary states and switches labeled 7 and 8 are always in complementary states. Thus, in a first switched-state, all switches labeled "1" are open and all switches labeled "2" are closed. In a second switched-state, all switches labeled "1" are closed and all switches labeled "2" are opened. In this embodiment, closing switches 1 charges the capacitors $C_1$, $C_2$, $C_3$, while discharging the capacitors $C_4$, $C_5$, $C_6$ and closing switches 2 has the complementary effect. Also, closing switches 7 charges capacitors $C_7$, $C_8$, $C_9$, while discharging capacitors $C_{10}$, $C_{11}$, $C_{12}$ and closing switches 8 has the complementary effect.

The power converter provides a total step-down of 32:1, assuming the regulating circuit 16A is a buck converter with a nominal step-down ratio of 2:1. Furthermore, if the input voltage is 32 V and the output voltage is 1 V, then the switches in the first switching network 12A will need to block 8 volts while the switches in the second switching network 12D will need to block 2 volts.

The modular architecture with the basic building blocks shown in FIGS. 1-4 may be configured to handle an AC input voltage as well. One of the main attributes of switched capacitor converters is their ability to operate efficiency over a large input range by reconfiguring the switched-capacitor network. If the AC wall voltage (i.e. 60 Hz & 120 $V_{RMS}$) can be thought of as a slow moving DC voltage, then the front-end switched-capacitor stage should be able to unfold the time-varying input voltage into a relatively stable DC voltage.

Figure 23:
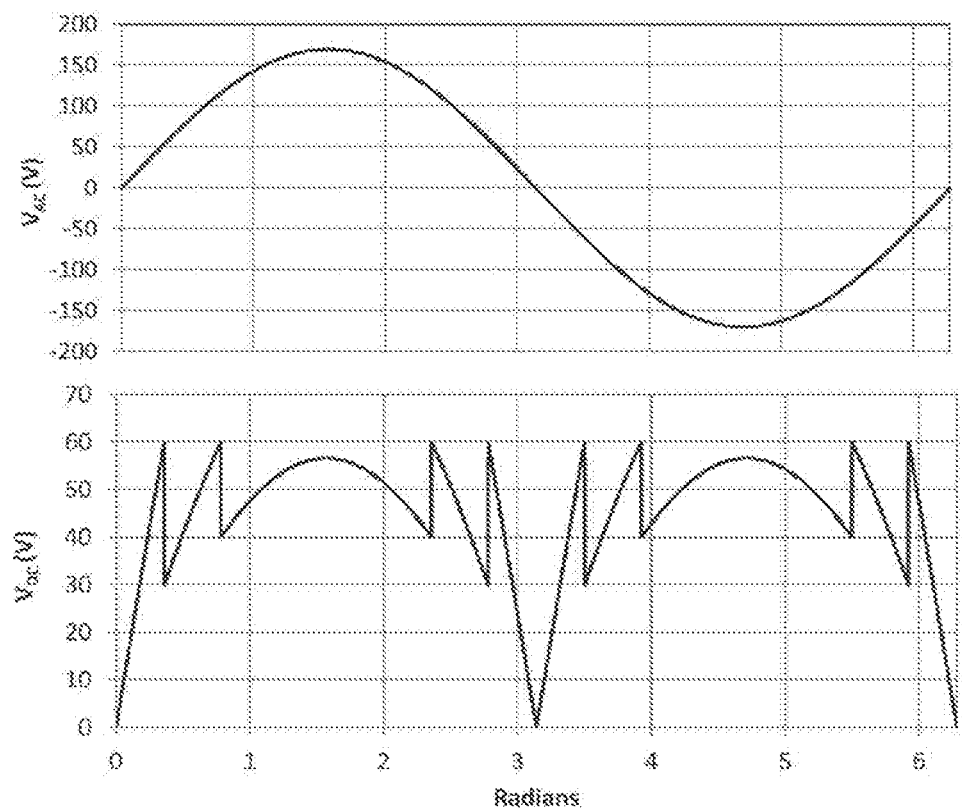
FIG. 23 shows an AC voltage rectified using a reconfigured switched-capacitor stage.

A diagram of a 120 $V_{RMS}$ AC waveform over a single 60 Hz cycle overlaid with the unfolded DC voltage is shown in FIG. 23. The AC switching network has different configurations (⅓, ½, 1/1) at its disposal along with an inverting stage. It was also designed to keep the DC voltage under 60 V. Once the AC voltage is unfolded, it is the job of the regulating circuit 16A, shown in FIG. 24, to produce a final output voltage. It may also be necessary to place another switching network 16A between the AC switching network 13A and regulating circuit 16A to further condition the voltage. If this is the case, then the caveats for series-connected stages hold true since the AC switching network 13A is a special purpose switching network 12A.

Figure 24:
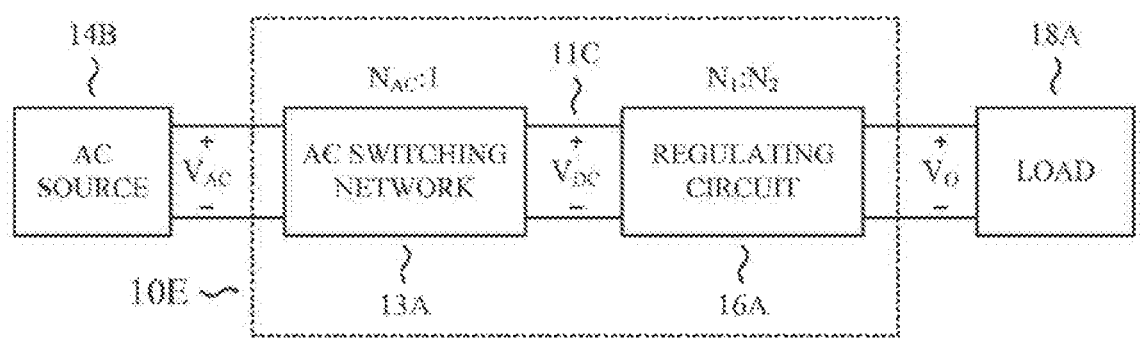
FIG. 24 shows an AC-DC power converter architecture.
Figure 27:
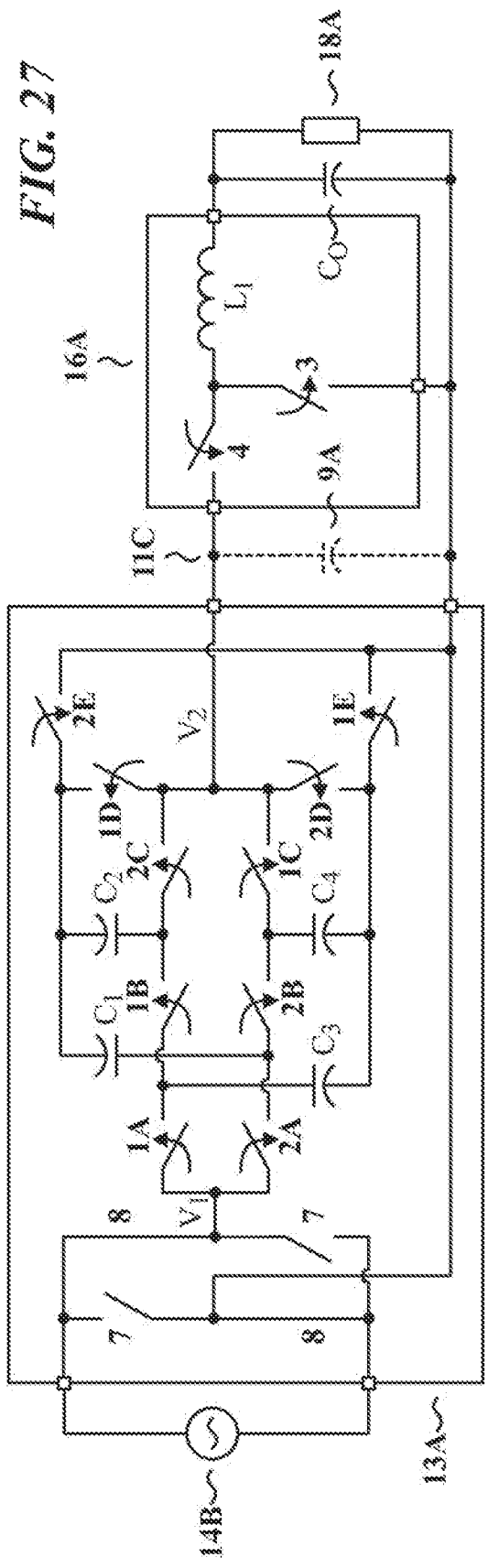
FIG. 27 shows the AC-DC converter illustrated in FIG. 25 during the negative portion of the AC cycle.

FIG. 25 shows the AC-DC converter corresponding to the architecture shown in FIG. 24. In this embodiment, the AC switching network 13A is a synchronous AC bridge followed by a reconfigurable two-phase step-down cascade multiplier with three distinct conversion ratios (⅓, ½, 1/1) while the regulating circuit 16A is a synchronous buck converter. In operation, switches labeled 7 and 8 are always in complementary states. During the positive portion of the AC cycle (0 to π radians) all switches 7 are closed while all switches labeled 8 are opened as shown in FIG. 26. Similarly, during the negative portion of the AC cycle (π to 2π radians) all switches labeled 8 are closed while all switches labeled 7 are opened as shown in FIG. 27.

In addition to the inverting function provided by switches 7 and 8, the switches labeled 1A-1E and switches labeled 2A-2E may be selectively opened and closed as shown in Table 1 to provide three distinct conversion ratios of: ⅓, ½ and 1.

TABLE 1

| $V_2/V_1$ | 1A | 1B | 1C | 1D | 1E | 2A | 2B | 2C | 2D | 2E |
|---|---|---|---|---|---|---|---|---|---|---|
| 1/3 | CLK | CLK | CLK | CLK | CLK | CLKB | CLKB | CLKB | CLKB | CLKB |
| 1/2 | CLKB | CLK | CLK | CLK | CLK | CLK | CLKB | CLKB | CLKB | CLKB |
| 1/1 | ON | ON | ON | OFF | OFF | ON | ON | ON | OFF | OFF |

The AC switching network 13A is provided with a digital clock signal CLK. A second signal CLKB is also generated, which may simply be the complement of CLK (i.e. is high when CLK is low and low when CLK is high), or which may be generated as a non-overlapping complement as is well known in the art. With a switching pattern set in accordance with the first row of Table 1, the AC switching network 13A provides a step-down ratio of one-third (⅓). With a switching pattern set in accordance with the second row of Table 1, the AC switching network 13A provides a step-down ratio of one-half (½). With a switching pattern set in accordance with the first row of Table 1, the AC switching network 13A provides a step-down ratio of one.

Figure 28:
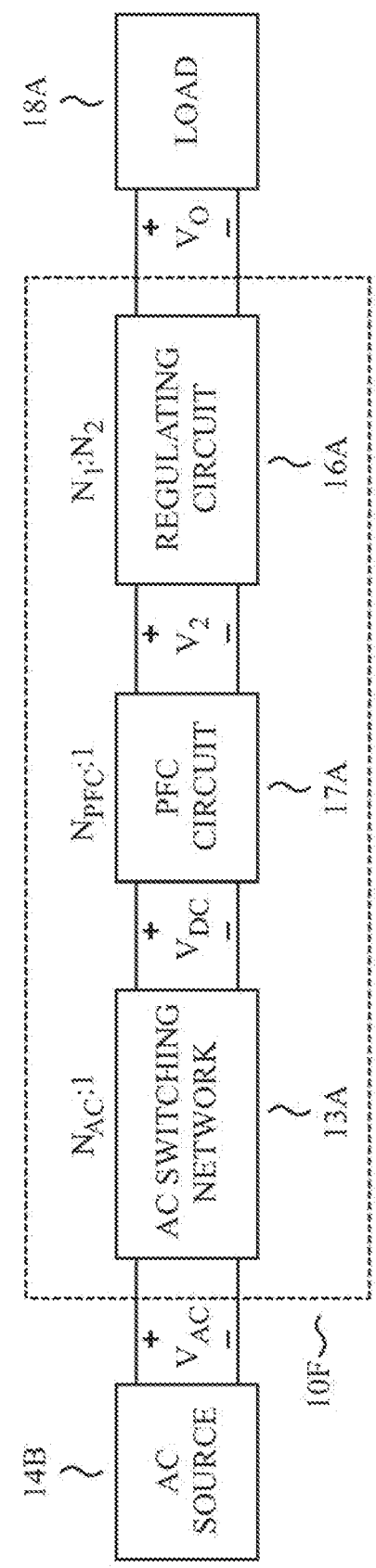
FIG. 28 shows an AC-DC power converter architecture with power-factor correction.

Most power supplies attached to the wall meet some power factor specification. Power factor is a dimensionless number between 0 and 1 that defines a ratio of the real power flowing to apparent power. A common way to control the harmonic current and thus boost the power factor is by using an active power factor corrector, as shown in FIG. 28. The power-factor correction circuit 17A causes the input current to be in phase with the line voltage, thus causing reactive power consumption to be zero.

FIGS. 29-36 show specific implementations of power converters that conform to the architectural diagrams shown in FIGS. 1-4. In each implementation a regulating circuit or multiple regulating circuits may limit both the RMS charging current and the RMS discharging current of at least one capacitor in each switching network so all of these switching networks are adiabatically charged switching networks. However, if decoupling capacitors 9A or 9B are present, then the ability of the regulating circuit to limit the RMS charging and discharging current may be diminished. Capacitors 9A and 9B are optional and to keep the output voltage fairly constant capacitor $C_O$ is used. Furthermore, for simplicity, the switching network in each implementation has a single conversion ratio. However, reconfigurable switching networks that provide power conversion at multiple distinct conversion ratios may be used instead.

In operation, switches labeled 1 and 2 are always in complementary states. Thus, in a first switched-state, all switches labeled "1" are open and all switches labeled "2" are closed. In a second switched-state, all switches labeled "1" are closed and all switches labeled "2" are opened. Similarly, switches labeled "3" are "4" are in complementary states, switches labeled "5" are "6" are in complementary states, and switches labeled "7" are "8" are in complementary states. Typically, the regulating circuits operate at higher switching frequencies than the switching networks. However, there is no requirement on the switching frequencies between and amongst the switching networks and regulating circuits.

Figure 29:
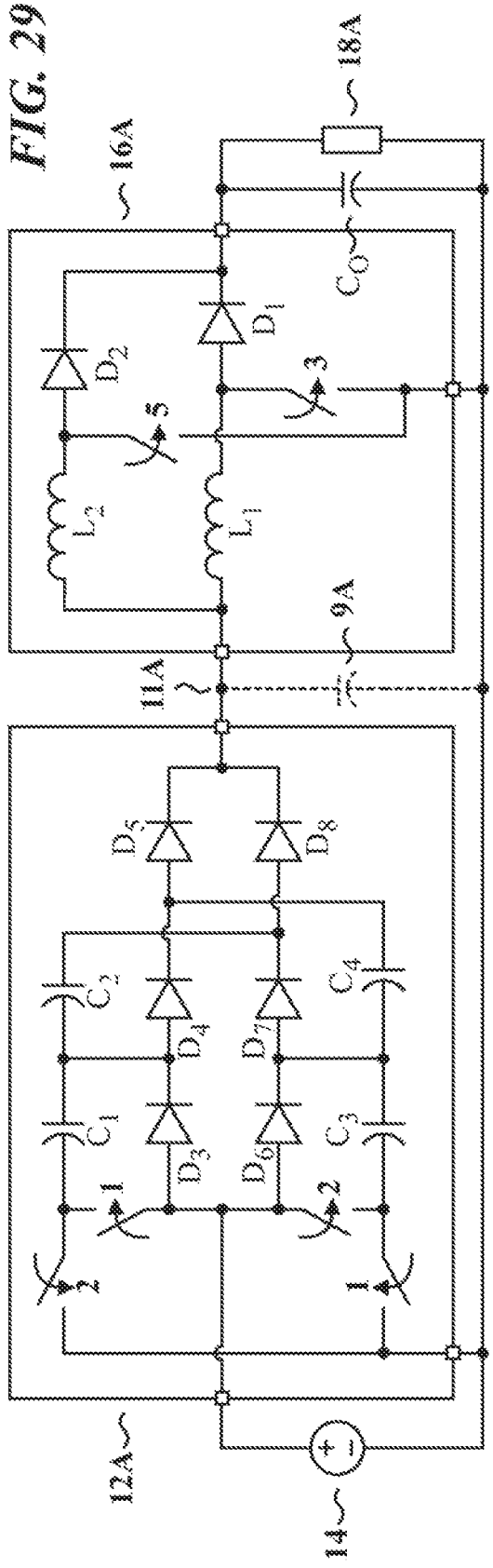
FIGS. 29 and 30 show particular implementations of the DC-DC converter illustrated in FIG. 1.

FIG. 29 shows a step-up converter corresponding to the architecture shown in FIG. 1. In this embodiment, the switching network 12A is a two-phase step-up cascade multiplier with a conversion ratio of 1:3 while the regulating circuit 16A is two-phase boost converter. In operation, closing switches labeled 1 and opening switches labeled 2 charges capacitors $C_3$ and $C_4$ while discharging capacitors $C_1$ and $C_2$. Conversely, opening switches labeled 1 and closing switches labeled 2 charges capacitors $C_1$, and $C_2$ while discharging capacitors $C_3$ and $C_4$.

Figure 30:
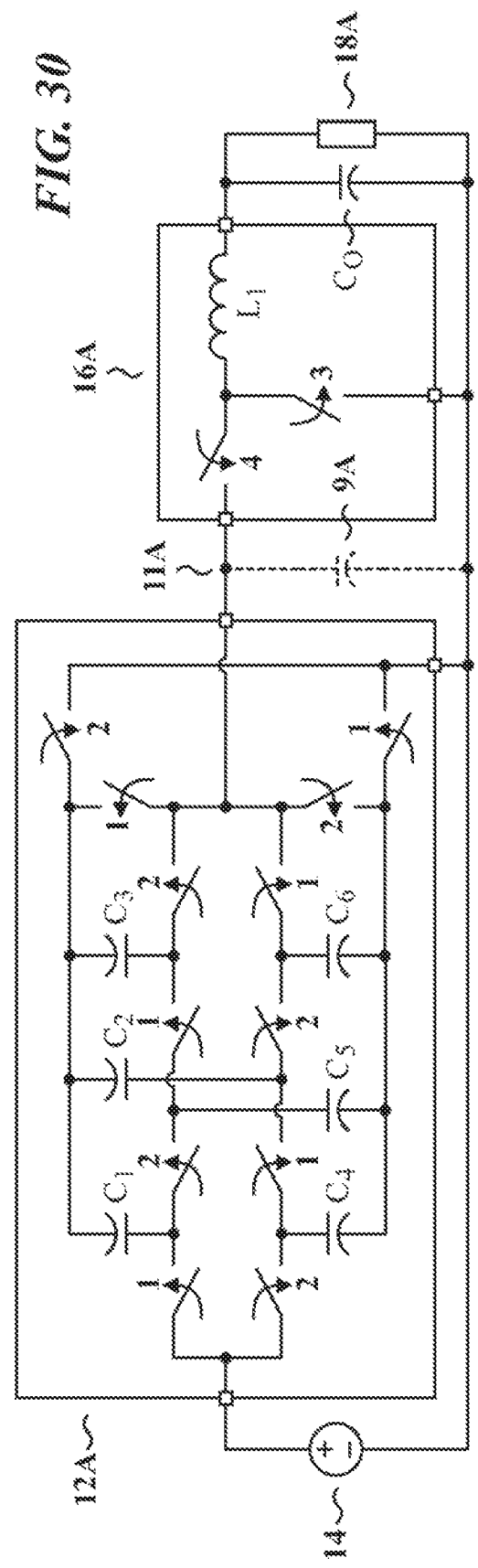

FIG. 30 shows bidirectional step-down converter corresponding to the architecture shown in FIG. 1A. In this embodiment, the switching network 12A is a two-phase step-down cascade multiplier with a conversion ratio of 4:1 while the regulating circuit 16A is synchronous buck converter. In operation, closing switches labeled 1 and opening switches labeled 2 charges capacitors $C_1$, $C_2$, and $C_3$ while discharging capacitors $C_4$, $C_5$, and $C_6$. Conversely, opening switches labeled 1 and closing switches labeled 2 charges capacitors $C_4$, $C_5$, and $C_6$ while discharging capacitors $C_1$, $C_2$, and $C_3$. All of the active components are implemented with switches so the converter can process power in both directions.

Figure 31:
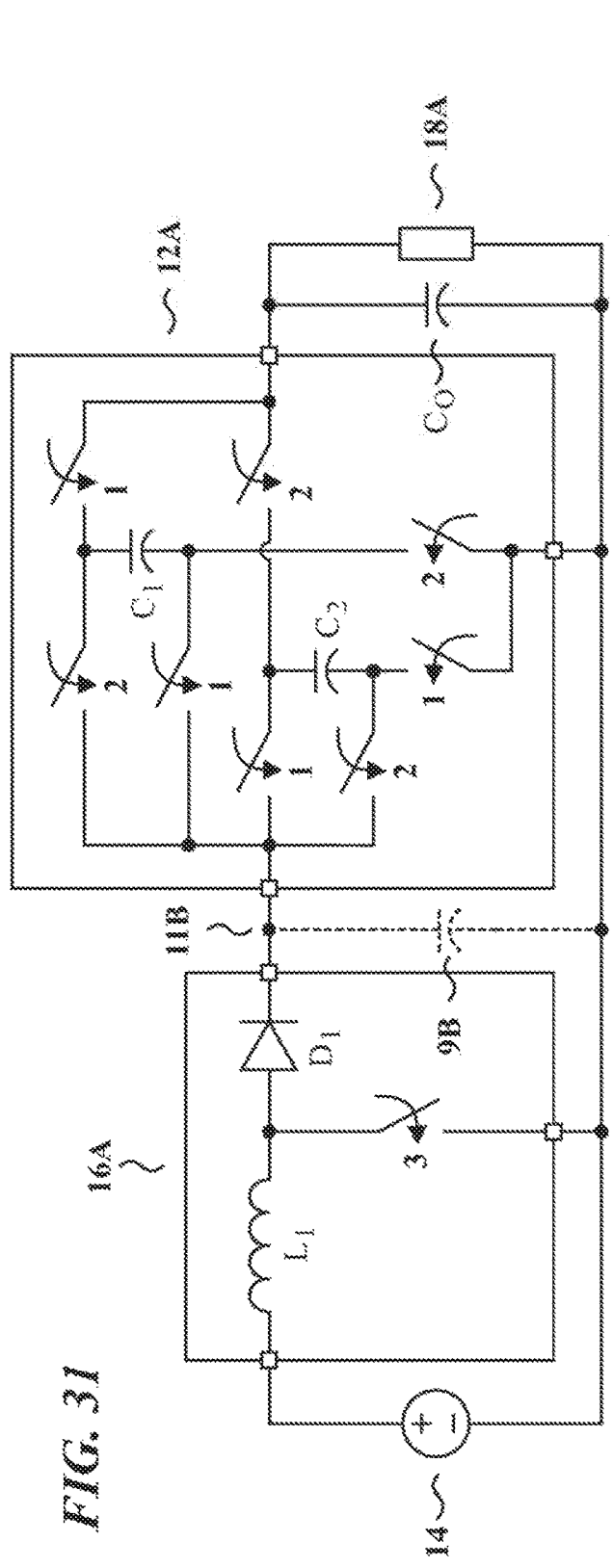
FIGS. 31 and 32 show particular implementations of the DC-DC converter illustrated in FIG. 3.

FIG. 31 shows a step-up converter consistent with the architecture shown in FIG. 3. In this embodiment, the regulating circuit 16A is boost converter while the switching network 12A is a two-phase step-up series-parallel SC converter with a conversion ratio of 2:1. In operation, closing switches 1 charges capacitor $C_2$ while discharging capacitor $C_1$. Closing switches 2 has the complementary effect.

Figure 32:
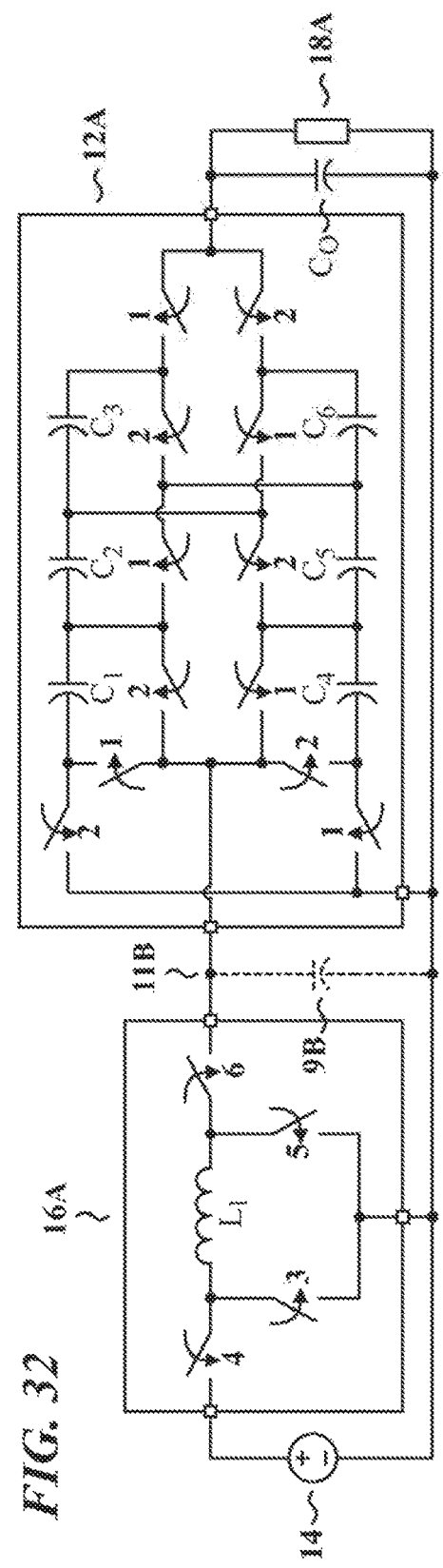

FIG. 32 shows a bidirectional up-down converter consistent with the architecture shown in FIG. 3. In this embodiment, the regulating circuit 16A is synchronous four switch buck-boost converter while the switching network 12A is a two-phase step-up cascade multiplier with a conversion ratio of 4:1. In operation, closing switches labeled 1 charges capacitors $C_4$, $C_5$, and $C_6$ while discharging capacitors $C_1$, $C_2$, and $C_3$. Closing switches 2 has the complementary effect. All of the active components are implemented with switches so the converter can process power in both directions.

Figure 33:
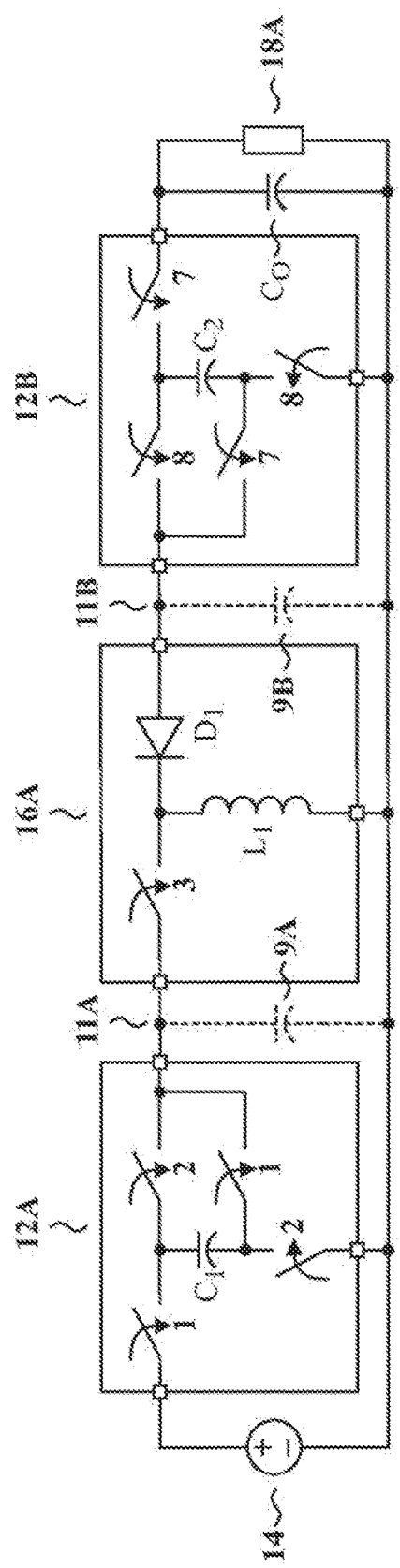
FIGS. 33 and 34 show particular implementations of the DC-DC converter illustrated in FIG. 2.

FIG. 33 shows an inverting up-down converter consistent with the architecture shown in FIG. 2. In this embodiment, the switching network 12A is a step-up series-parallel SC converter with a conversion ratio of 2:1, the regulating circuit 16A is a buck/boost converter and the switching network 12B is a step-up series-parallel SC converter with a conversion ratio of 2:1. In operation, closing switches 1 charges capacitor $C_1$ while closing switches 2 discharges capacitor $C_1$. Similarly, closing switches 7 discharges capacitor $C_2$ while closing switches 8 charges capacitor $C_2$.

Figure 34:
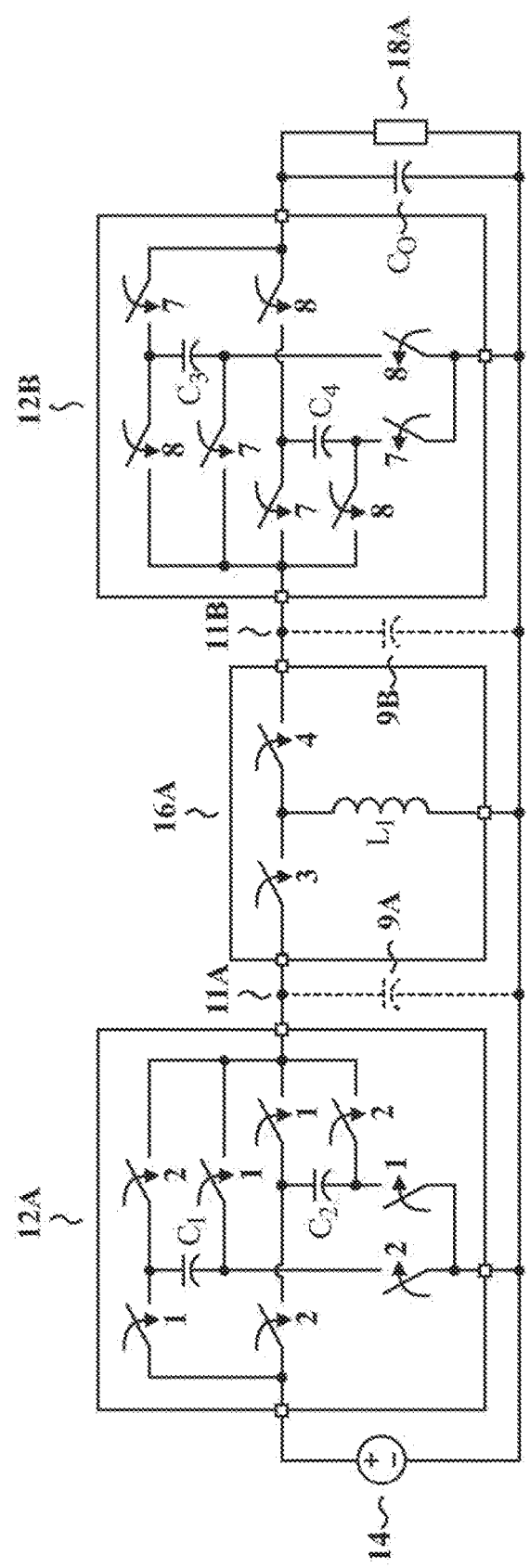

FIG. 34 shows a bidirectional inverting up-down converter consistent with the architecture shown in FIG. 2. In this embodiment, the switching network 12A is a two-phase step-up series-parallel SC converter with a conversion ratio of 2:1, the regulating circuit 16A is a synchronous buck/boost converter and the switching network 12B is a two-phase step-up series-parallel SC converter with a conversion ratio of 2:1. In operation, closing switches 1 charges capacitor $C_1$ while discharging capacitor $C_2$. Closing switches 2 has the complementary effect. Similarly, closing switches 7 charges capacitor $C_4$ while discharging capacitor $C_3$. Closing switches 2 has the complementary effect. All of the active components are implemented with switches so the converter can process power in both directions.

Figure 35:
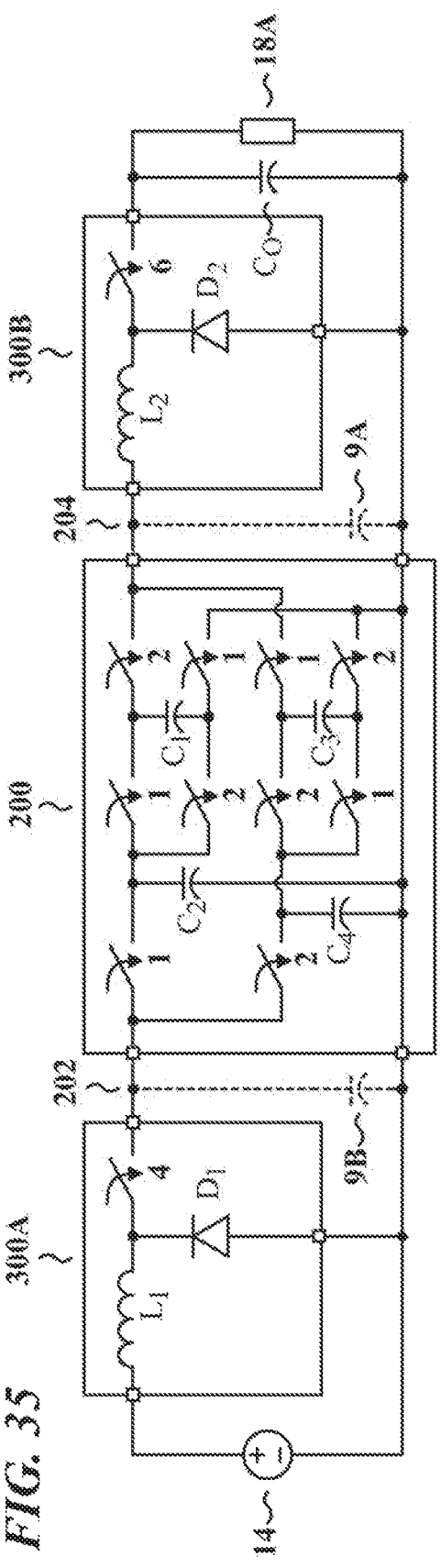
FIGS. 35 and 36 show particular implementations of the DC-DC converter illustrated in FIG. 4.

FIG. 35 shows a step-down converter consistent with the block diagram shown in FIG. 4. In this embodiment, the regulating 300A is a boost converter, the switching network 200 is a two-phase step-up series-parallel SC converter with a conversion ratio of 2:1 and the regulating circuit 300B is a boost converter. In operation, closing switches labeled 1 charges capacitors $C_1$ and $C_2$ while simultaneously discharging capacitors $C_3$ and $C_4$. Closing switches 2 has the complementary effect.

Figure 36:
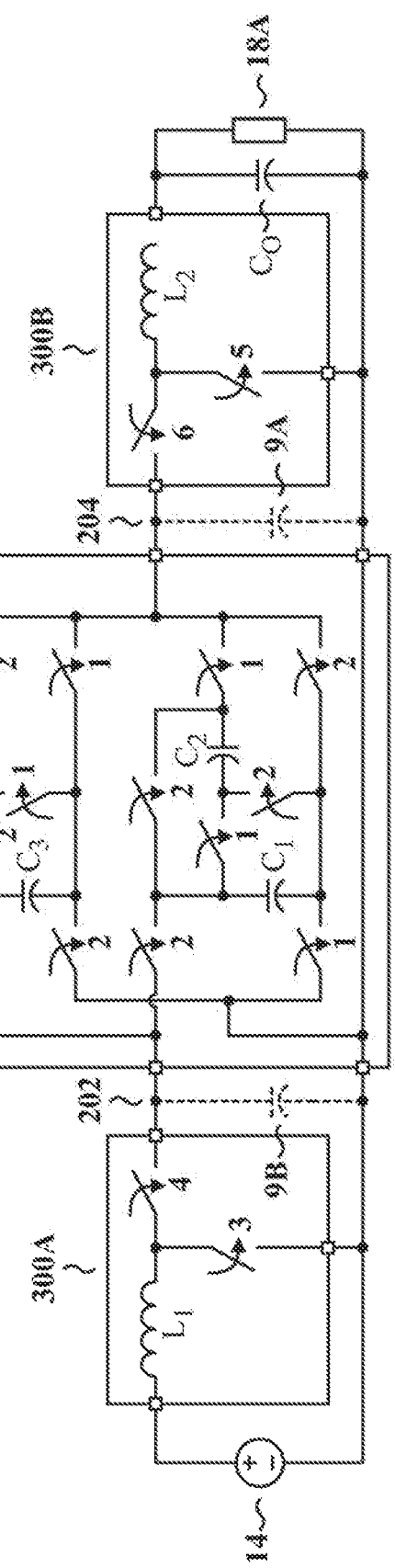

FIG. 36 shows a bidirectional up-down converter consistent with the block diagram shown in FIG. 4. In this embodiment, the regulating 300A is a synchronous boost converter, the switching network 200 is a two-phase fractional step-down series-parallel SC converter with a conversion ratio of 3:2 and the regulating circuit 300B is a synchronous buck converter. In operation, closing switches 1 charges capacitors $C_3$ and $C_4$ while simultaneously discharging capacitors $C_1$ and $C_2$. Closing switches 2 has the complementary effect. All of the active components are implemented with switches so the converter can process power in both directions.

It should be understood that the topology of the regulating circuit can be any type of power converter with the ability to regulate the output voltage, including, but without limitation, synchronous buck, three-level synchronous buck, SEPIC, soft switched or resonant converters. Similarly, the switching networks can be realized with a variety of switched-capacitor topologies, depending on desired voltage transformation and permitted switch voltage.

Having described one or more preferred embodiments, it will be apparent to those of ordinary skill in the art that other embodiments incorporating these circuits, techniques and concepts may be used. Accordingly, it is submitted that the scope of the patent should not be limited to the described embodiments, but rather, should be limited only by the spirit and scope of the appended claims.

The invention claimed is:

1. A resonant power converter comprising:
a switched capacitor arrangement including a plurality of capacitors to be alternately connected to a first group of switches or to a second group of switches to respectively implement one or more switching patterns via one or more switching frequencies so as to transfer energy from an input port to an output port of the resonant power converter;
a switched magnetic arrangement including at least one inductor arranged in a configuration with the switched capacitor arrangement to facilitate a charge of at least some of the plurality of capacitors at a charge rate during operation of the resonant power converter; and
a controller to implement a deadtime interval,
wherein the charge rate is to be determined, at least in part, by the at least one inductor so as to prevent or reduce loss of the energy of the switched capacitor arrangement, and
wherein the one or more switching frequencies to include a frequency to facilitate zero current switching (ZCS) of at least some switches of the first or the second group of switches.

2. The resonant power converter of claim 1, wherein the at least one inductor to facilitate a discharge of the at least some of the plurality of capacitors at a discharge rate during operation of the resonant power converter.

3. The resonant power converter of claim 1, wherein the at least one inductor comprises a magnetic core.

4. The resonant power converter of claim 1, wherein the at least some of the plurality of capacitors to be shorted together via a shared phase node during operation of the resonant power converter.

5. The resonant power converter of claim 1, wherein the energy is to be provided to the input port during operation of the resonant power converter by a source of electrical energy, the source of electrical energy to comprise at least one of the following: a power converter or a battery.

6. The resonant power converter of claim 1, wherein, during operation of the resonant power converter, with one or more switches of the first or the second group of switches in an open state during the one or more switching patterns, voltages across the one or more switches to differ by a factor of substantially two or less.

7. The resonant power converter of claim 1, wherein the resonant power converter is to draw discontinuous current during operation.

8. The resonant power converter of claim 1, wherein the resonant power converter is to provide power to multiple loads, directly or indirectly.

9. The resonant power converter of claim 8, wherein the power is to be provided via a buck converter.

10. The resonant power converter of claim 1, wherein the resonant power converter comprises a single-stage power converter or a bidirectional multi-stage power converter.

11. The resonant power converter of claim 1, wherein voltage at the output port of the resonant power converter is to be regulated via a buck converter.

12. The resonant power converter of claim 11, wherein the voltage at the output port of the resonant power converter is to comprise a voltage below about 1.0 Volts.

13. An integrated circuit (IC) for use in a resonant power converter, the IC comprising:
one or more drivers; and
a controller including a modulator, the modulator to generate a switching frequency to facilitate zero current switching (ZCS) of at least some of a plurality of switches external to the IC;
the controller to generate one or more signals to control the plurality of switches substantially in accordance with the switching frequency, the plurality of switches to implement a switching pattern for a switched capacitor arrangement external to the IC to include a plurality of capacitors and for a switched magnetic arrangement external to the IC to include at least one inductor, the switched magnetic arrangement to be included in a configuration with the switched capacitor arrangement to facilitate a charge of at least some of the plurality of capacitors at a charge rate during operation of the resonant power converter,
wherein the charge rate is to be determined, at least in part, by the at least one inductor so as to prevent or reduce loss of the energy of the switched capacitor arrangement.

14. The IC of claim 13, wherein the configuration is to facilitate a discharge of the at least some of the plurality of capacitors at a discharge rate during operation of the resonant power converter, the discharge rate to be determined, at least in part, by the at least one inductor.

15. The IC of claim 14, wherein the charge rate and the discharge rate are substantially the same.

16. The IC of claim 13, wherein the controller to generate one or more control signals for the resonant power converter.

17. The IC of claim 13, wherein the controller is to implement a variable-frequency control via a pulse-width modulator (PWM).

18. The IC of claim 13, wherein, during operation of the resonant power converter, with one or more switches of the plurality of switches in an open state during the switching pattern, voltages across the one or more switches to differ by a factor of substantially two or less.

19. The IC of claim 13, wherein the resonant power converter comprises a single-stage power converter or a bidirectional multi-stage power converter.

20. The IC of claim 13, wherein the resonant power converter is to implement a particular conversion ratio, to be determined based, at least in part, on a number of capacitors of the plurality of capacitors to be included in the configuration.

21. The IC of claim 13, wherein the modulator comprises a frequency modulator.

22. The IC of claim 13, wherein the one or more drivers to drive the plurality of switches to implement the switching pattern.

23. A controller for a resonant power converter, the controller comprising:

one or more drivers; and a modulator, the modulator to generate a switching frequency to facilitate zero current switching (ZCS) of at least some of a plurality of switches, the controller to generate one or more signals to control the plurality of switches in accordance with the switching frequency, the plurality of switches to be interconnected with a plurality of passive devices and controllable to switch between a first switch configuration and a second switch configuration to respectively correspond to at least a first phase and a second phase, wherein the first phase via the first switch configuration is to facilitate at least a positive change in charge on at least one passive device of the plurality of passive devices and the second phase via the second switch configuration is to facilitate at least a negative change in charge on the at least one passive device of the plurality of passive devices.

24. The controller of claim 23, wherein the plurality of passive devices is to comprise a plurality of capacitors and at least one inductor.

25. The controller of claim 23, wherein the controller is to implement a deadtime interval.

26. The controller of claim 23, wherein the switching frequency is to comprise a frequency at or near a resonant frequency to facilitate switching of the at least some of the plurality of switches.

27. The controller of claim 23, wherein the controller is to implement at least one of the following: a variable-frequency control; or control based, at least in part, on current.

28. The controller of claim 23, wherein the modulator comprises a frequency modulator.

29. The controller of claim 23, wherein the positive change in charge is to comprise a positive adiabatic change in charge and wherein the negative change in charge is to comprise a negative adiabatic change in charge.

30. The controller of claim 23, wherein the one or more drivers to drive the plurality of switches to implement the first and the second switch configuration.

* * * * *